United States Patent
Tsuruoka et al.

[11] Patent Number: 5,992,240
[45] Date of Patent: *Nov. 30, 1999

[54] PRESSURE DETECTING APPARATUS FOR MEASURING PRESSURE BASED ON DETECTED CAPACITANCE

[75] Inventors: Michihiko Tsuruoka, Kanagawa; Takahiro Kudo, Tokyo; Masato Takahashi, Tokyo; Nobuhisa Kato, Tokyo; Kimihiro Nakamura, Tokyo; Shuji Tsukamoto, Tokyo, all of Japan

[73] Assignee: Fuji Electric Co., Ltd., Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/754,495

[22] Filed: Nov. 20, 1996

[30] Foreign Application Priority Data

| Nov. 21, 1995 | [JP] | Japan | 7-302383 |
| Jan. 29, 1996 | [JP] | Japan | 8-012762 |
| Mar. 21, 1996 | [JP] | Japan | 8-063953 |

[51] Int. Cl.[6] .................................................. G01L 9/12
[52] U.S. Cl. ....................................... 73/718; 73/724
[58] Field of Search ................ 73/718, 724; 361/283.1, 361/283.3, 283.4

[56] References Cited

U.S. PATENT DOCUMENTS

| 4,445,383 | 5/1984 | Binder et al. . |
| 4,625,560 | 12/1986 | Sanders . |
| 4,670,733 | 6/1987 | Bell . |
| 4,741,214 | 5/1988 | Vidmantas . |

FOREIGN PATENT DOCUMENTS

| 0074176 | 3/1983 | European Pat. Off. . |
| 0160713 | 11/1985 | European Pat. Off. . |
| 520352 A2 | 12/1992 | European Pat. Off. . |
| 558690 | 8/1932 | Germany . |
| 2943231A1 | 12/1980 | Germany . |
| 228350A1 | 10/1985 | Germany . |
| 3912219A1 | 10/1989 | Germany . |
| 3920674C2 | 1/1990 | Germany . |
| 4011734A1 | 10/1990 | Germany . |
| 40421411C2 | 10/1990 | Germany . |
| 4104056 C1 | 7/1992 | Germany . |
| 4224524A1 | 1/1993 | Germany . |
| 4206675A1 | 9/1993 | Germany . |
| 4402085 C2 | 8/1994 | Germany . |
| 64-71211 | 3/1989 | Japan . |
| 412813 | 3/1992 | Japan . |
| 61228 | 1/1994 | Japan . |
| 7-209122 | 8/1995 | Japan . |

OTHER PUBLICATIONS

Silicon Diaphragm Capacitive Vacuum Sensor–K. Hatanaka et al.; Technical Digest of the 13th Sensor Symposium, 1995; pp. 37–40 (no month).

Smart Pressure Sensors for Industrial Applications –Moore; Sensors, Jun. 1995; pp. 32, 33, 48 and 49 (no month).

*Primary Examiner*—William L. Oen
*Attorney, Agent, or Firm*—Greer, Burns & Crain, Ltd.

[57] ABSTRACT

A capacitance-based pressure detecting apparatus detects a pressure applied to a diaphragm based on a capacitance which varies depending on the change in portion of the diaphragm. The pressure detecting apparatus comprises a diaphragm which changes position depending on a differential pressure between a first pressure and a second pressure, a first electrode which is provided opposite a first plane of the diaphragm and forms, together with the diaphragm, a first capacitor, a second electrode which is provided opposite a second plane of the diaphragm and forms, together with the diaphragm, a second capacitor, a third capacitor altering a capacitance according to the first pressure, a detecting unit for detecting the capacitance of the first through third capacitors, and an operation unit for obtaining a pressure applied to the diaphragm based on the capacitance of the first and second capacitors, and amending the obtained pressure based on the capacitance of the third capacitor.

33 Claims, 31 Drawing Sheets

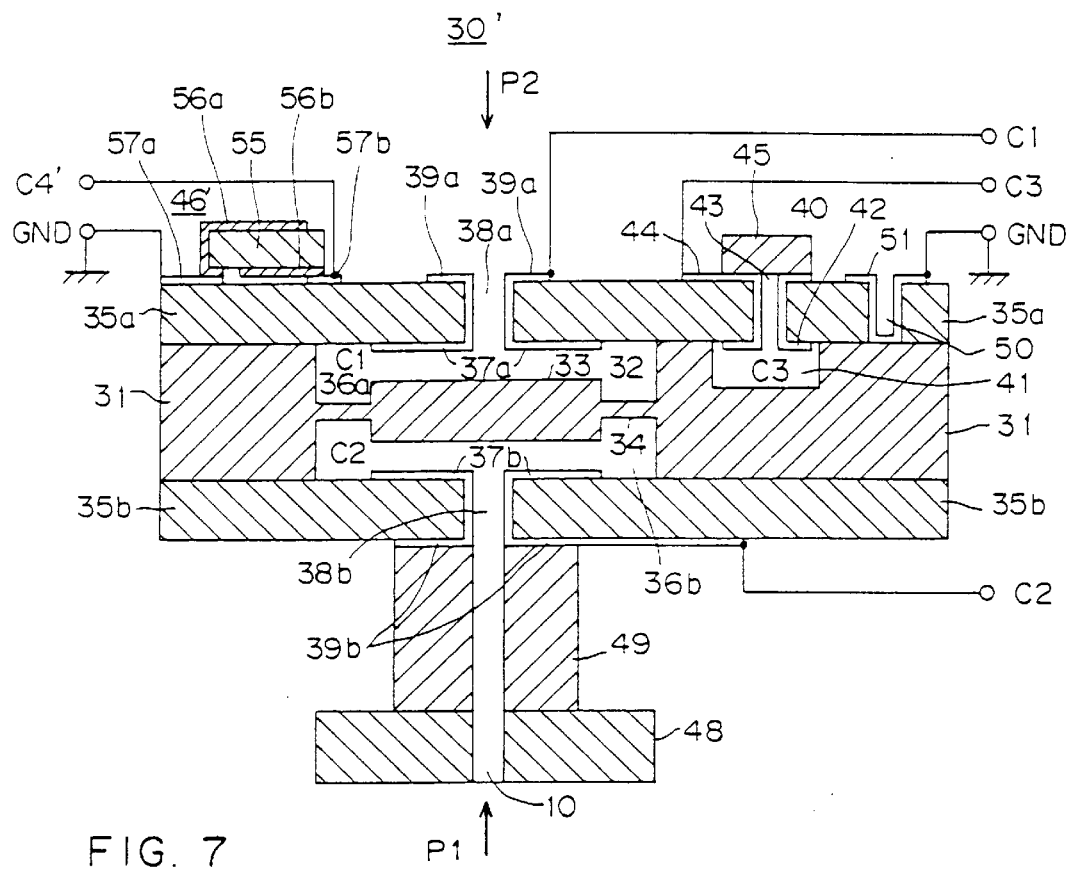
FIG. 7
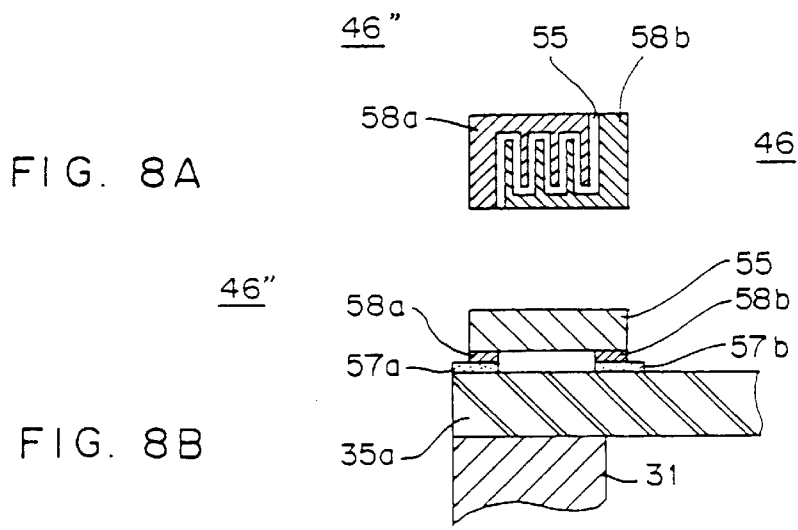
FIG. 8A
FIG. 8B

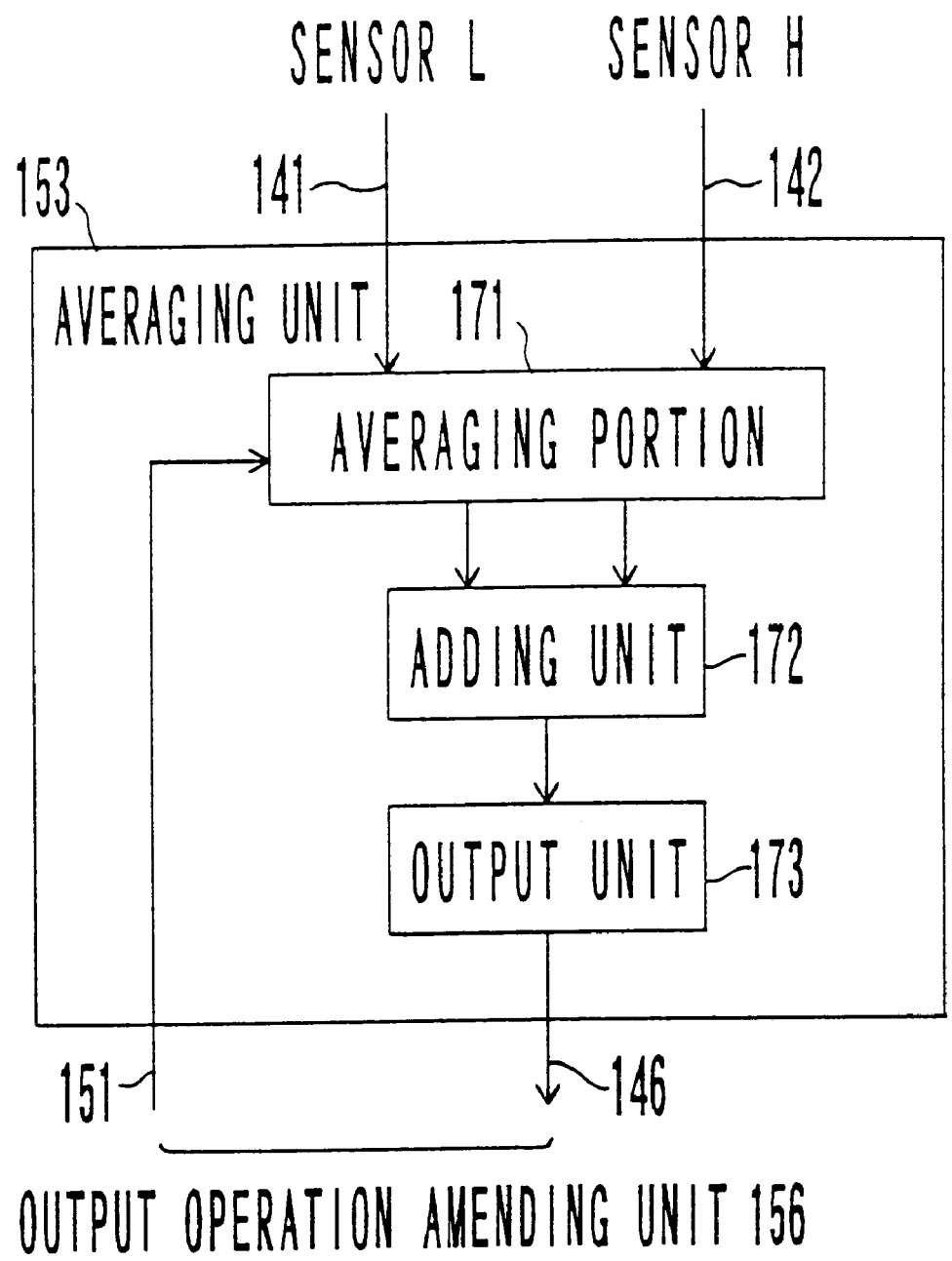
F I G. 1 6

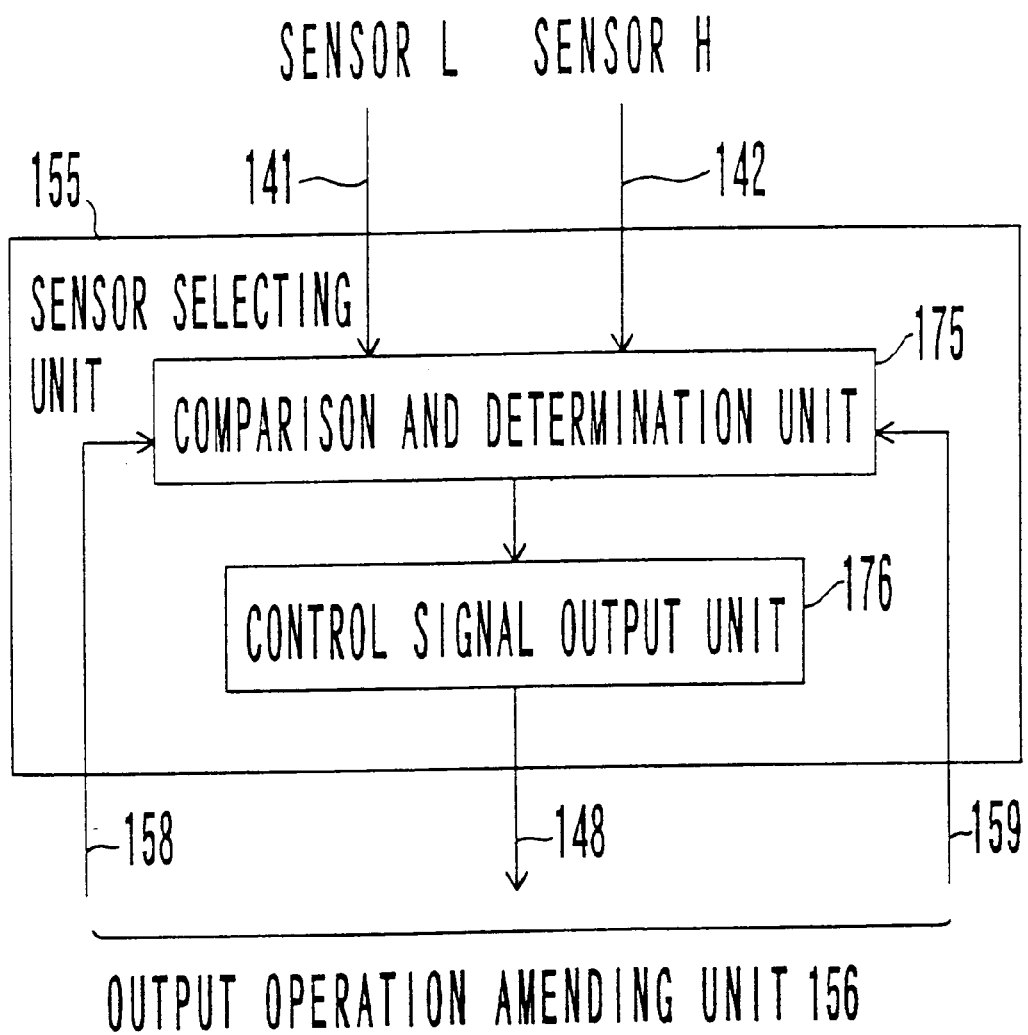
F I G. 1 8

(1) RNZ = 0 %   RNS = 100 %
(2) RNZ = 0 %   RNS = 50 %
(3) RNZ = 50 %  RNS = 50 %

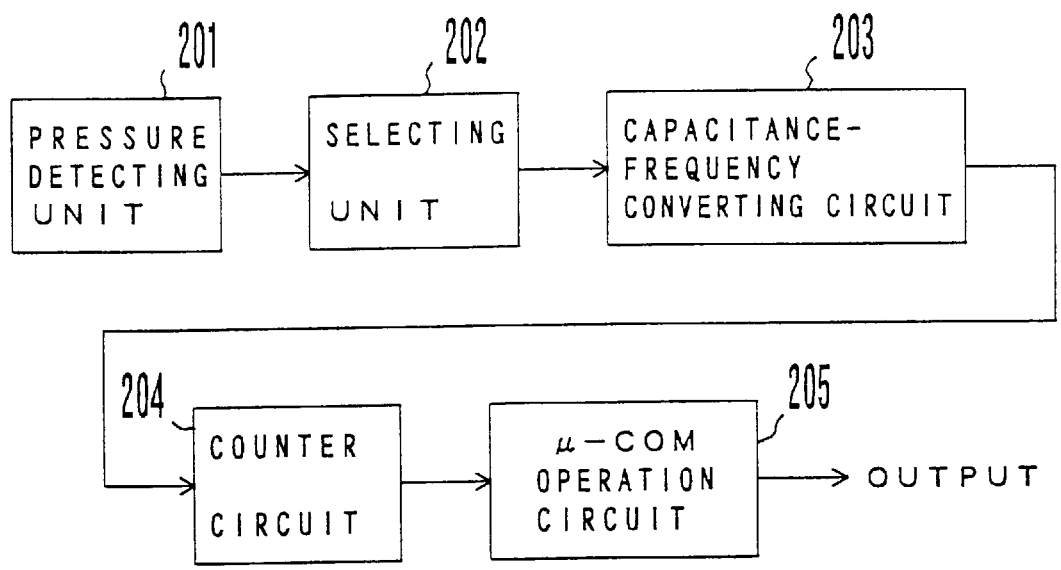
F I G. 2 6

PRESSURE DETECTING APPARATUS FOR MEASURING PRESSURE BASED ON DETECTED CAPACITANCE

BACKGROUND OF THE INVENTION

1. Field of the Invention

The present invention relates to a pressure detecting apparatus for computing pressure by measuring a displacement of a diaphragm which changes depending on the pressure, and more specifically to a capacitance type pressure detecting apparatus for computing the pressure according to the displacement of the diaphragm detected based on the change in the capacitance formed between the diaphragm and an electrode.

2. Description of the Related Art

A conventional capacitance-based pressure detecting apparatus is described in the Japanese Patent Publication No. 06-1228 (Tokko-hei No.06-1228). FIG. 1 shows a pressure detection unit 1 of the pressure detecting apparatus.

The pressure detection unit 1 comprises a diaphragm 2 made of silicon, first conductive plates 3a and 3b, insulator plates 4a and 4b, supporters 5a and 5b, glass joints 6a and 6b, and second conductive plates 7a and 7b. The first conductive plates 3a and 3b are provided opposite each other at a predetermined distance (d) from the diaphragm 2. The insulator plates 4a and 4b hold the first conductive plates 3a and 3b and the supporters 5a and 5b as insulated from the second conductive plates 7a and 7b. The diaphragm 2 is fixed to the supporters 5a and 5b through the glass joints 6a and 6b.

As shown in FIG. 1, pressure-introducing tubes 8a and 8b penetrate the first conductive plates 3a and 3b, insulator plates 4a and 4b, and second conductive plates 7a and 7b. The pressure-introducing tubes 8a and 8b introduce pressures P1 and P2 respectively to the center of the pressure detection unit 1. A conductive film 9 is provided on the inner surfaces of the pressure-introducing tubes 8a and 8b. The second conductive plates 7a and 7b are electrically connected to the first conductive plates 3a and 3b through the conductive film 9.

With the configuration of the pressure detection unit 1, the left and right portions of the diaphragm 2 function as capacitors having capacitances C1 and C2 respectively.

FIG. 2 shows an example of a pressure detector realized by the pressure detection unit 1. Incompressible fluid (a pressure conducting medium) such as silicon oil, etc. is sealed in portions 10 and 11 or pressure-receiving chambers 14a and 14b in a pressure detector 12. In the incompressible fluid, the pressure detection unit 1 is fixed to the case of the body at the pressure-introducing tube 8a side. When pressure is detected by the pressure detector, it is transmitted from seal diaphragms 13a and 13b to the diaphragm 2 through the incompressible fluid.

However, when the pressure detector is filled with the incompressible fluid such as silicon oil as described above, the capacitances C1 and C2 depend on the dielectric constant. Therefore, if the dielectric constant alters with a change in temperature or pressure, there arises a problem of error in measuring a pressure.

A method of amending the error can be to determine the pressure from a displacement Δ of the diaphragm 2 after assigning the measured values of the capacitances C1 and C2 to the following equation (1), $$(C1-C2)/\{(C1+C2)-2Ck\}=\Delta/d \tag{1}$$

where d indicates the space between the diaphragm 2 and the first conductive plates 3a and 3b, and Ck indicates the parasitic capacitance generated between the conductors other than the electrodes.

The values of the capacitances C1 and C2 can be represented by the following equation (2) where S indicates the area of the electrode, ε indicates the relative dielectric constant of the pressure conducting medium (silicon oil), and ε0 indicates the dielectric constant in a vacuum (electric constant). Obtaining the pressure by the above described equation (1) removes the term relating to the dielectric constant of the pressure conducting medium, thereby successfully computing the change indicated by the diaphragm 2 without the influence of the dielectric constant (permittiuity) of the pressure conducting medium which alters with temperature or pressure.

$$C1 = \varepsilon 0 \cdot \varepsilon \cdot S / (d - \Delta) \tag{2}$$
$$C2 = \varepsilon 0 \cdot \varepsilon \cdot S / (d + \Delta)$$

However, when a high-precision measurement is required, the following problems arise. That is, when a high-pressure is measured, the entire pressure detection unit 1 receives pressure and is externally compressed, and the space between the diaphragm 2 and the first conductive plates 3a and 3b is reduced with the capacitances C1 and C2 increased. Equation (2) can be represented by the following equation (3) where δ indicates the change in the space.

$$C1 = \varepsilon 0 \cdot \varepsilon \cdot S / (d - \Delta - \delta) \tag{3}$$
$$C2 = \varepsilon 0 \cdot \varepsilon \cdot S / (d + \Delta - \delta)$$

Therefore, equation (1) can then be represented by the following equation (4), and cannot remove δ which depends on pressure.

$$(C1-C2)/\{(C1+C2)-2Ck\}=\Delta/(d-\delta) \tag{4}$$

If the temperature of the pressure conducting medium alters, the space between the diaphragm 2 and the first conductive plates 3a and 3b changes, and subsequently the capacitances C1 and C2 also change. Since not a small error occurs from these changes when pressure is to be detected with high precision, a temperature sensor or a secondary pressure sensor is required to make necessary amendments. In this case, such problems as increasing costs arise with an increasing number of required devices and signal processing circuits, etc.

A relatively simple pressure sensor for solving these problems is described in "Smart Pressure Sensors for Industrial Application, SENSORS June 1995, pp. 32, 33, 48, and 49".

FIG. 3 shows the corresponding pressure sensor.

In FIG. 3, 21 is a reference capacitor, and 22 is a sense capacitor. They are formed on a silicon substrate 23. In this apparatus, test pressure is applied to both sides of the reference capacitor 21 and one side of the sense capacitor 22. To the other side of the sense capacitor 22, a reference pressure is applied. A differential pressure is obtained based on the ratio of the capacitance of the reference capacitor 21 to that of the sense capacitor 22 (R=Cr/Cs where Cr and Cs respectively indicate the capacitances of the reference capacitor 21 and sense capacitor 22).

According to the above mentioned document, the ratio R is computed by the following equation (5).

$$R = Cr/Cs = (Tb - Ts)/(Tb - Tr) \quad (5)$$

where Ts, Tr, and Tb are determined by the following equation (6).

$$Ts = (Cs + Cp)Rf \quad (6)$$

$$Tr = (Cr + Cp)Rf$$

$$Tb = (Cr + Cs + Cp)Rf$$

where Cp indicates the parasitic capacitance based on the stray capacitance, and Rf indicates the feedback resistance of a transmitter used in the measurement.

Although the apparatus shown in FIG. 3 can avoid the influence of the parasitic capacitance Cp commonly found in both reference capacitor 21 and sense capacitor 22, there is a problem with this apparatus that it cannot compensate for the effect of the parasitic capacitance and Cs and Cr themselves on the reference capacitor 21 and sense capacitor 22 caused by a change in temperature and pressure.

"Silicon Diaphragm Capacitive Vacuum Sensor, K. Hatanaka et al., Technical Digest of the 13th Sensor Symposium, 1995 pp. 37–40" describes a vacuum sensor in which two pressure sensors are used to sufficiently cover a measurement range. However, this example analyzes the relationship between the pressure applied to a sensor and the output of the sensor for each of the sensors, but does not disclose the technology for measurement covering a wide range with high precision by combining two sensor signals in pressure analysis.

A technology of processing output signals from a plurality of pressure sensors is described in the Japanese Laid-Open Patent Publication (Tokkai-hei) No. 7-209122. This technology definitely and consecutively connects the characteristics curves of individual sensors by applying a weighting function in an intermediate range in which the pressure measurement ranges of two pressure sensors based on different measurement principles overlap each other.

However, in the method disclosed in this publication, the weighting function may weight only the output of the sensor indicating a larger change when the outputs of the sensors change with the influence of a disturbance such as a change in the ambient temperature, etc. As a result, there is the problem that a change in output with such a disturbance cannot be reduced. A similar problem arises when a disturbance affects the output from one sensor only, thereby influencing the specification of the characteristics of the intermediate range as well as the characteristics of the sensor. Thus, according to the above described technology disclosed in this publication, a reduction in the precision of a sensor output cannot be avoided.

Furthermore, the technology also has the following problems.

First, when a sensor signal is amended for temperature, etc., the amendment should be made to each of a plurality of sensor signals and amendment data should be prepared for each sensor, thereby causing an increase in costs. Since processes are always performed using a plurality of sensors, the outputs of all sensors should be always monitored and amended. Thus, the process speed is lowered and the consumption of electric power is increased. In particular, a long time is required to perform both a weighting process in an intermediate range and a process of amending outputs from the weighting process, thereby reducing the entire process speed and increasing the consumption of electric power. Furthermore, when a setting of a pressure measurement range is changed, an appropriate signal should be selected from a plurality of sensors, and the selected sensor signals should be smoothly coupled. In such cases, the processes become complicated and a desired precision cannot be easily guaranteed.

The pressure detecting apparatus detects a change made by a difference in pressure as indicated by a diaphragm by a change in capacitance. The problems with this apparatus are, for example, that the transformation characteristics of a detection signal are non-linear because of the stray capacitance or parasitic capacitance generated in the sensor unit, that a measurement error occurs, etc.

Methods of solving these problems are disclosed by the Japanese Laid-Open Patent Publication (Tokkai-sho) No. 64-71211 and the Japanese Patent Publication (Tokko-hei) No. 4-12813. According to the former, the influence of the parasitic capacitance can be reduced by using the ratio between two capacitances. According to the latter, the influence of the parasitic capacitance can be removed by using a fixed capacitance equivalent to the parasitic capacitance.

However, since the capacitance indicates a change in a quadratic curve in response to a pressure according to the former, an amending process such as a linearizing process, etc. becomes complicated. As a result, it is hard to detect pressure with high precision and the measurement range is limited. This is described below by referring to FIGS. 4A through 4C. FIG. 4A simply shows a capacitor portion, and FIGS. 4B and 4C show the relationship between the pressure and capacitance ratio.

As shown in FIG. 4A, in the apparatus in which a movable electrode ELV is provided for two fixed electrodes ELF, the capacitances C1 and C2 between the electrodes indicate changes such that one capacitance increases while the other decreases, if the movable electrode ELV moves left or right when a change in pressure is applied thereto. Assuming that d indicates the space between the movable electrode ELV and the fixed electrode ELF, the capacitances C1 and C2 can be computed as follows, when the movable electrode ELV indicates a change in portion (displacement) of $\Delta d$ as indicated by the broken line shown in FIG. 4A.

$$C1 = \epsilon S/(d1 - \Delta d1)$$

$$C2 = \epsilon S/(d2 - \Delta d2)$$

$\epsilon$: dielectric constant between electrodes

S: area of the electrodes

According to the method disclosed in the Japanese Laid-Out Patent Publication (Tokkai-sho) No. 58-21104), a change in portion of the movable electrode ELV is computed by the following equation.

$$(C1 - C2)/(C1 + C2) = \Delta d1/d1$$

where the displacement $\Delta d1$ is proportional to the pressure, and therefore, the value of $(C1-C2)/(C1+C2)$ linearly changes with the pressure P as shown in FIG. 4B.

In the method disclosed in the Japanese Laid-open Patent Publication No. 64-71211, the relationship between the capacitance ratio and the change in pressure is represented by the following equation.

$$C1/C2 = (d1 + \Delta d1)/(d1 - \Delta d1)$$

Although the change $\Delta d1$ is proportional to the pressure, a measurement error occurs because the relationship between the capacitance ratio and the pressure indicates a change in a quadratic curve.

As disclosed in the Japanese Patent Publication No. 4-12813, a parasitic capacitance changes with a change in temperature when the parasitic capacitance is canceled using a fixed capacitance equivalent to the parasitic capacitance. Therefore, it is difficult to eliminate the parasitic capacitance over all temperature ranges using a specific fixed capacitance. Furthermore, an output voltage V is obtained based on the following equation using a power-supply voltage E.

$$V=(C1-C2)/(C1+C2) \times E$$

In this case, the power-supply voltage E may alter, and any noise on this voltage will affect a detected signal and make it unstable. Such noise may also badly affect digital signal processing.

SUMMARY OF THE INVENTION

The present invention has been developed to solve the above described problems, and aims at providing a pressure detecting apparatus capable of measuring pressure with high precision at a low cost. It also aims at providing a pressure detecting apparatus capable of easily processing a detection signal in a short signal process time with a small amount of power consumption in a process circuit. Furthermore, the present invention aims at providing a pressure detecting apparatus with extremely high detection precision and with the influence of a parasitic capacitance significantly reduced.

The pressure detecting apparatus according to the present invention is a capacitance-based pressure detecting apparatus for detecting a pressure applied to a diaphragm based on the capacitance which varies with a change in position (displacement) of the diaphragm. It includes a diaphragm sensitive to a differential pressure between a first pressure and second pressure, a first electrode provided opposite the first plane of the diaphragm to form a first capacitor together with the diaphragm, a second electrode provided opposite the second plane of the diaphragm to form a second capacitor together with the diaphragm, a third capacitor which changes its capacitance according to the first pressure, a detecting unit for detecting the capacitances of the first through third capacitors, and an operation unit for determining the pressure applied to the diaphragm based on the capacitances of the first and second capacitors and amending the determined pressure based on the capacitance of the third capacitor. Through this amendment (absolute pressure amendment), the detected pressure can be amended depending on the level of the pressure applied to the pressure detecting apparatus, thereby improving the detection precision of the pressure detecting apparatus.

The pressure detecting apparatus may further include a switching unit for switching the connections between the detecting unit and the first through third capacitors to selectively transmit an output from the first through the third capacitors to the detecting unit. Using the switching unit does not require a detecting unit for each capacitor, thereby realizing an apparatus at a low cost.

The third capacitor comprises a third electrode formed on the insulation substrate and a conductive substrate. A vacuum is substantially maintained between the third electrode and the conductive substrate. With this configuration, the third capacitor can detect the level of the absolute pressure (the above described first pressure) without receiving any influence from a change in the dielectric constant of a pressure conducting medium by temperature or pressure.

The pressure detecting apparatus may further include a fourth capacitor altering its capacitance according to the ambient temperature around the diaphragm. The operation unit provides a temperature amendment for the determined pressure based on the capacitance of the fourth capacitor. In this case, the switching unit switches the connections between the first through fourth capacitors and the detecting unit to selectively transmit an output from the first through fourth capacitors to the detecting unit. The fourth capacitor may comprise a conductive substrate and third electrode between which an insulation substrate is placed. The temperature amendment allows a detected pressure to be amended depending on the temperature of the pressure detecting apparatus, thereby improving the detection precision of the pressure detecting apparatus.

The fourth capacitor may comprise a pair of electrodes formed with a dielectric substrate contained between them. Providing the dielectric substrate made of, for example, ceramics whose dielectric constant has high temperature dependent between a pair of the electrodes of the fourth capacitor, allows the temperature influence to be detected with high precision. Thus, the pressure can be amended with high precision.

The above described fourth capacitor may be formed by a pair of comb-shaped electrodes arranged as interlocking with each other on a substrate. Using the above described fourth capacitor, the apparatus can be easily produced at a low cost.

The pressure detecting apparatus according to the present invention may further comprises a fifth capacitor which sandwiches a pressure conducting medium for transmitting the first pressure to the diaphragm. In this case, the operation unit makes amendments depending on the change in the dielectric constant of the pressure conducting medium to the pressure obtained based on the capacitance of the fifth capacitor. Through the amendments, the influence of the dielectric constant of a pressure conducting medium variable with temperature and pressure can be removed from a detected pressure. As a result, the pressure detection precision can be considerably improved. At this time, the switching unit switches the connections between the first through fifth capacitors and the detecting unit to selectively transmit one of the outputs from the first through fifth capacitors to the detecting unit.

The fifth capacitor includes the third electrode formed on an insulation substrate and a conductive substrate. The pressure conducting medium fills the space between the third electrode and the conductive substrate. The fifth capacitor may be formed by a pair of comb-shaped electrodes arranged as interlocking with each other on a insulation substrate. In this case, the above described pressure conducting medium fills the space between the pair of comb-shaped electrodes. With the configuration, the apparatus can be easily produced at a low cost.

The third capacitor may comprises a third electrode formed on an insulation substrate and a conductive substrate. A vacuum is substantially maintained between the third electrode and the conductive substrate. The portion of the conductive substrate corresponding to the third capacitor is formed to have a predetermined thickness through a plasma-etching process applied on both sides of the conductive substrate. As a result, the conductive substrate of the portion corresponding to the third capacitor can be made thin. With the configuration of the above described third capacitor, the detection precision of the absolute pressure can be improved and more precise amendments can be made to the absolute pressure.

Another pressure detecting apparatus according to the present invention includes a first diaphragm sensitive to differential pressure between the first pressure and second pressure, a first electrode provided opposite the first plane of the diaphragm to form the first capacitor together with the first diaphragm, a second electrode provided opposite the second plane of the first diaphragm to form the second capacitor together with the first diaphragm, a second diaphragm sensitive to the differential pressure between the first pressure and second pressure, a third electrode provided opposite the first plane of the second diaphragm to form the third capacitor together with the second diaphragm, a fourth electrode provided opposite the second plane of the second diaphragm to form the fourth capacitor together with the second diaphragm, a fifth capacitor changing its capacitance according to the first pressure, a detecting unit for detecting the capacitances of the first through fifth capacitors, and an operation unit for obtaining the pressure applied to the diaphragm based on the capacitances of the first, second, third, and fourth capacitors and amending the obtained pressure based on the capacitance of the fifth capacitor. Using two diaphragms, the pressure detection results are compared and selected to detect pressure with higher precision.

The pressure detecting apparatus may further include a switching unit for switching the connection between the detecting unit and the first through fifth capacitors to selectively transmit an output from the first through the fifth capacitors to the detecting unit. Using the switching unit does not require a detecting unit for each capacitor, thereby realizing the apparatus at a low cost.

The pressure detecting apparatus may further include a sixth capacitor which alters its capacitance depending on the ambient temperature around the first or second diaphragm. The operation unit can provide a temperature amendment for the pressure based on the capacitance of the sixth capacitor. In this case, the switching unit switches the connection between the first through sixth capacitors and the detecting unit to selectively transmit an output from the first through sixth capacitors to the detecting unit. The temperature amendment allows a detected pressure to be altered depending on the temperature of the pressure detecting apparatus, thereby improving the detection precision of pressure. The sixth capacitor may comprise a conductive substrate and a fifth electrode between which an insulation substrate is placed.

One of the above described two diaphragm can be used for lower pressures, and the other can be used for higher pressures. In this case, the first diaphragm is made thinner than the second diaphragm. Otherwise, the circumference of the first diaphragm is made thinner than that of the second diaphragm. Using these two types of diaphragms realizes pressure measurement with high precision covering a wide pressure range.

The above described operation unit can include one or more, or all of an averaging unit for averaging and outputting a pressure value computed according to the capacitances of the first and second capacitors and a pressure value computed according to the capacitances of the third and fourth capacitors, a sensor selecting unit for selecting and outputting one of the pressure value computed according to the capacitances of the first and second capacitors and the pressure value computed according to the capacitances of the third and fourth capacitors, and a composite signal generating unit for combining and outputting by a predetermined method the pressure value computed according to the capacitances of the first and second capacitors and the pressure value computed according to the capacitances of the third and fourth capacitors. At this time, the operation unit can include an output operation amending unit for selectively operating one of the averaging unit, sensor selecting unit, and composite signal generating unit to obtain an output signal. Thus, a more appropriate pressure amending mode is selected, and pressure can be detected with high precision.

The pressure detecting apparatus according to the present invention may further comprises a seventh capacitor which sandwiches a pressure conducting medium for transmitting the first pressure to the above described first and second diaphragms. In this case, the operation unit makes amendments depending on the change in the dielectric constant of the pressure conducting medium to the obtained pressure based on the capacitance of the seventh capacitor. At this time, the switching unit switches the connection between the first through seventh capacitors and the detecting unit to selectively transmit one of the outputs from the first through seventh capacitors to the detecting unit. Through the amendments, the influence of the dielectric constant of the pressure conducting medium variable with temperature and pressure can be removed from a detected pressure. As a result, the pressure detection precision can be considerably improved.

The detecting unit may includes a capacitance converting unit for converting the capacitance of the first through seventh capacitors into pulse signals, a counter circuit for detecting the number of pulses of the pulse signals and the time at which the pulse signals are generated, and an operating circuit for determining the capacitance of the first through seventh capacitors based on the number of pulses of the pulse signals detected by the counter circuit and the time at which they are generated.

The above described capacitance converting unit can include a Schmidt trigger gate which generates a pulse before the discharge voltage of the first through seventh capacitors reaches a second threshold after passing a first threshold.

The above described capacitance converting unit can include a NAND gate which generates at a high level of a gate voltage a pulse before the discharge voltage of the first through seventh capacitors reaches a second threshold after passing a first threshold.

Furthermore, the above described capacitance converting unit can include a circuit, comprising two resistors and two inverters, for generating a pulse before the discharge voltage of the first through seventh capacitors reaches a second threshold after passing a first threshold.

Capacitance can be detected with high precision by detecting the capacitance of a capacitor as described above using a pulse signal obtained by charging and discharging the capacitor. The consumption of the electric power of the apparatus can be reduced to a low level by limiting the time for generating a pulse signal.

The above described capacitance converting unit can also include a circuit, comprising two switches connected to a constant current source and a gate, for generating a pulse before the discharge voltage of the first through seventh capacitors reaches a second threshold after passing a first threshold. With this configuration, the input voltage of the gate indicates a waveform with a steep slope around the threshold voltage, thereby considerably reducing the influence of noise.

The above described capacitance converting unit can be formed by a circuit having a first resistor, and a second resistor and three inverters connected in parallel with the first resistor. The capacitance converting unit can also be formed by a circuit having a first resistor, and a second resistor a NAND gate, and connected in two inverters parallel with the first resistor. Furthermore, the capacitance converting unit can be formed by a serial circuit having two switches connected to a constant current source, a resistor, and three inverters. With this configuration, the change in charge/discharge voltage of the capacitor can be increased. Therefore, the oscillation frequency of a pulse can be reduced, and the power consumption can also be reduced.

BRIEF DESCRIPTION OF THE DRAWINGS

FIG. 7 is a sectional view showing the second embodiment of the pressure detecting unit of the pressure detecting apparatus of the present invention;

FIGS. 8A and 8B are respectively a top view and a sectional view showing the second example of the temperature detecting unit according to the second embodiment;

FIG. 16 is a block diagram showing the configuration of the averaging unit of the operating circuit according to the present invention;

FIG. 18 is a block diagram showing the configuration of the sensor selecting unit of the operating circuit according to the present invention;

FIG. 26 is a block diagram showing the configuration of the pressure detecting apparatus corresponding to the pressure detecting unit according to the sixth embodiment of the present invention;

DESCRIPTION OF THE PREFERRED EMBODIMENT

Figure 5:
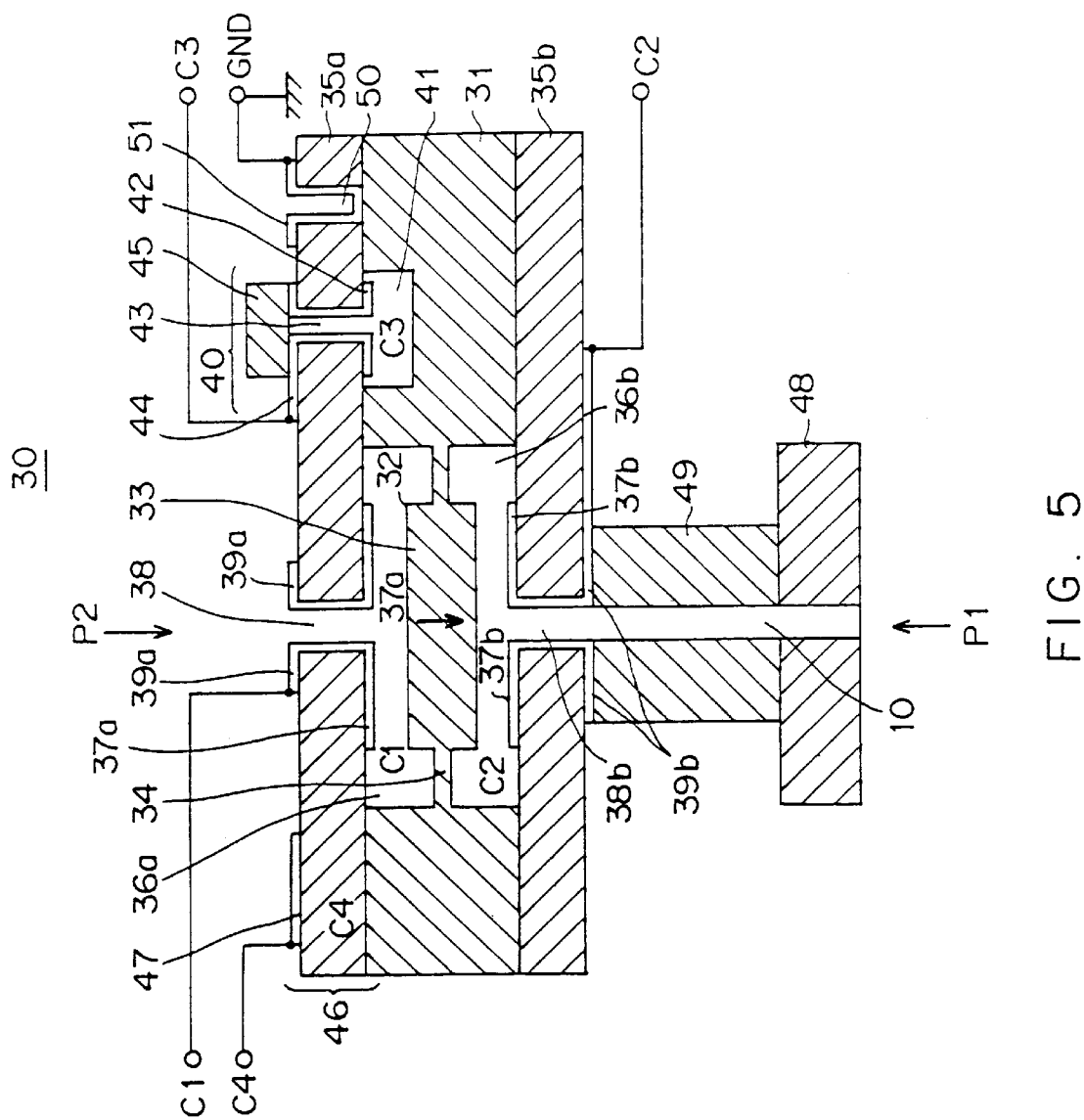
FIG. 5 is a sectional view showing the first embodiment of the pressure detecting unit of the capacitance-based pressure detecting apparatus of the present invention.

FIG. 5 is a sectional view showing the first embodiment of the pressure detecting unit (sensor) of the capacitance-based pressure detecting apparatus according to the present invention. A pressure detecting unit 30 is used instead of, for example, the pressure detecting unit 1 in the pressure detector 12 shown in FIG. 2. In this case, the pressure detector shown in FIG. 2 can be the pressure detecting apparatus according to the present invention.

As shown in FIG. 5, the pressure detecting unit 30 comprises a silicon substrate 31 and insulation substrates 35a and 35b between which the silicon substrate 31 is fixed. A diaphragm 32 is formed at the center of the silicon substrate 31 by performing a plasma-etching process, etc. on both sides of the silicon substrate 31. The diaphragm 32 comprises a flat portion 33 formed as flat and thinner than the silicon substrate 31, and a thin portion 34 formed as a thin circular unit surrounding the flat portion 33. The insulation substrates 35a and 35b are made of an insulation material having a thermal expansion coefficient approximately equal to that of the silicon substrate 31. For example, the material can be a pyrex glass, and is air-tightly connected to the circumference of the silicon substrate 31 through an electrostatic. Thus, spaces 36a and 36b are formed on both sides of the diaphragm 32.

Fixed electrodes 37a and 37b are formed on the portion corresponding to the flat portion 33 of the diaphragm 32 of the insulation substrates 35a and 35b by applying two layers of Cr and Au by the spatter method, etc. Capacitors C1 and C2 (whose capacitances are also represented by C1 and C2) are formed between the insulation substrates 35a and 35b and the diaphragm 32. Pressure-guide apertures 38a and 38b connect the spaces 36a and 36b to an external area. Electrodes 39a and 39b are formed around the pressure-guide apertures 38a and 38b by the spatter method, etc. from inside to outside of the pressure guide apertures 38a and 38b of the insulation substrates 35a and 35b as shown in FIG. 5. The electrodes 39a and 39b are electrically connected to the fixed electrodes 37a and 37b.

The pressure detecting unit 30 is further provided with an absolute pressure detecting unit 40 and a temperature detecting unit 46. The absolute pressure detecting unit 40 is provided with a space 41 (vacuum space) generated by processing a silicon substrate by, for example, plasma-etching it to the depth of the flat portion 33 of the diaphragm 32. The electrode 42 is provided at the insulation substrate 35a side of the space 41 as shown in FIG. 5, and a lead electrode 44 is formed inside an aperture 43 provided at the insulation substrate 35a to connect the space 41 to an external area, and outside the insulation substrate 35a surrounding the aperture 43. The lead electrode 44 is electrically connected to an electrode 42, and a capacitor C3 is formed between the electrode 42 and the silicon substrate 31. An insulation substrate 45 is connected to the lead electrode 44 through diffusion bonding, static bonding, etc. in a vacuum atmosphere to keep vacuum inside the space 41. The insulation substrate 45 is not limited to an insulating material.

The temperature detecting unit 46 includes an electrode 47 provided on the outer surface of the insulation substrate 35a. A capacitor C4 is formed between the electrode 47 and the silicon substrate with the insulation substrate 35a provided between them.

Figure 1:
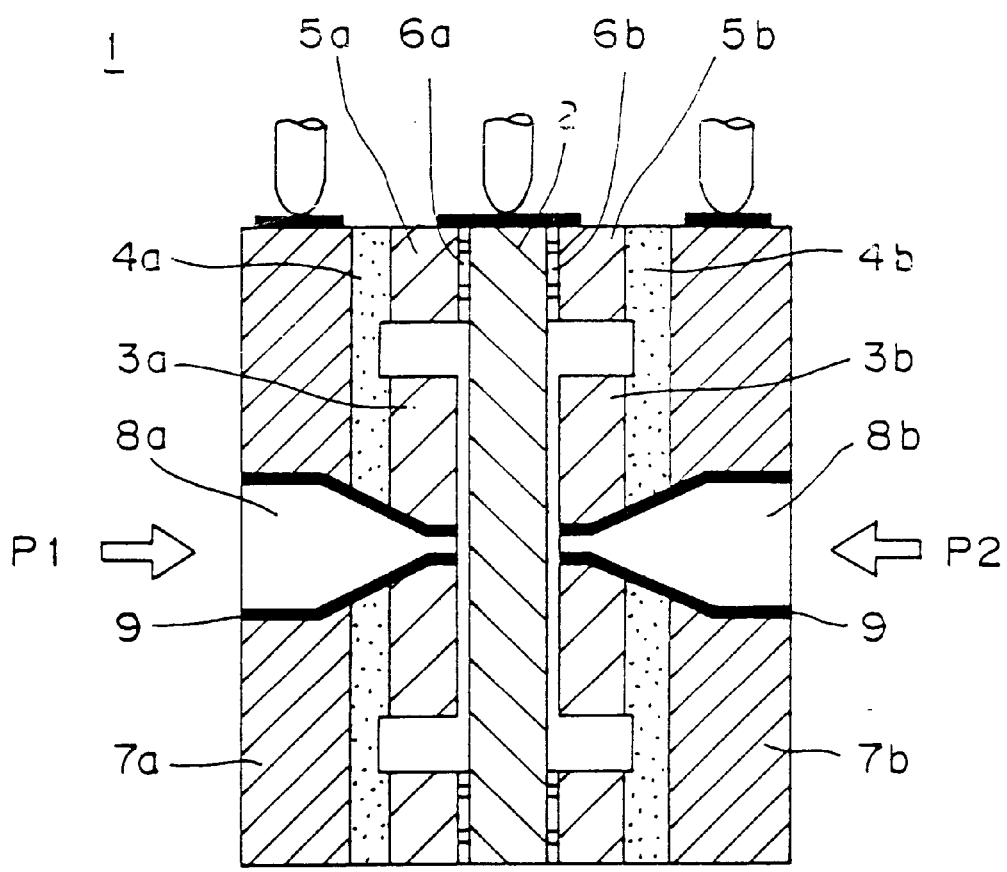
FIG. 1 is a sectional view of the pressure detecting unit of the conventional capacitance-based pressure detecting apparatus.
Figure 2:
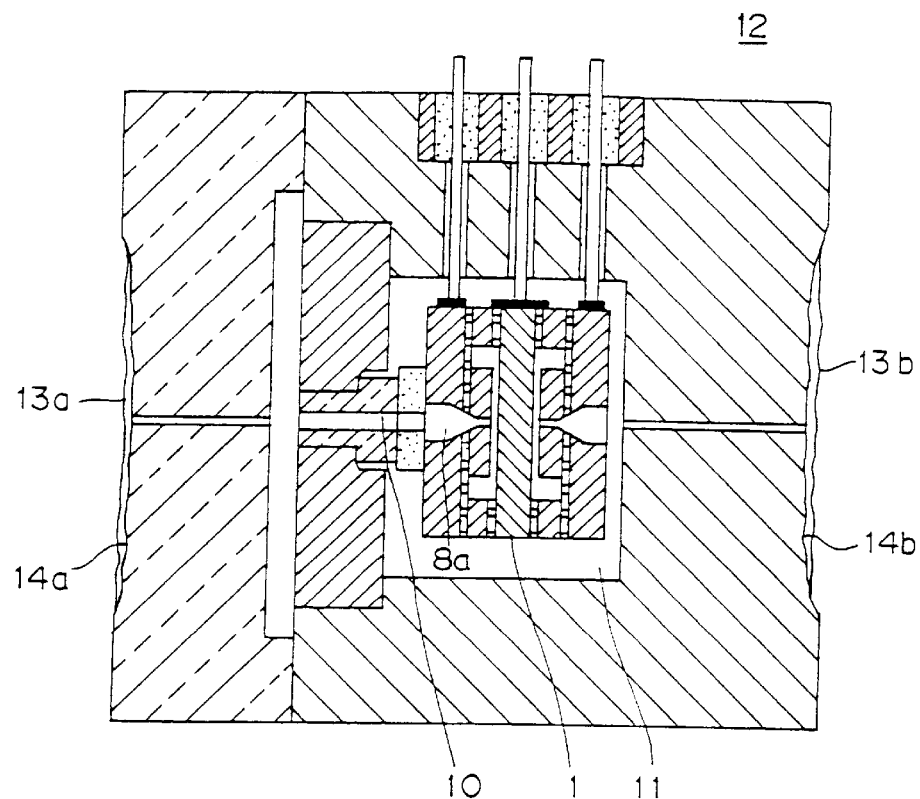
FIG. 2 is a sectional view of the conventional capacitance-based pressure detecting apparatus.
Figure 3:
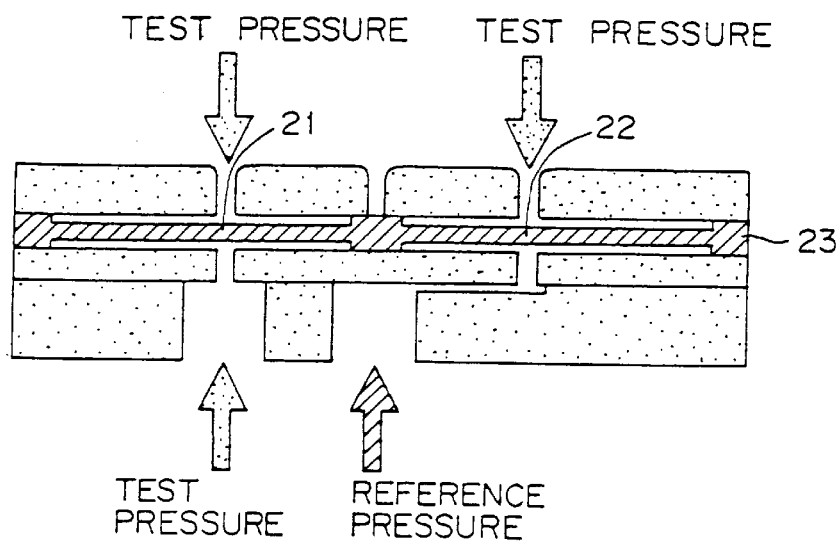
FIG. 3 is a sectional view of the conventional pressure sensor.
Figure 4A:
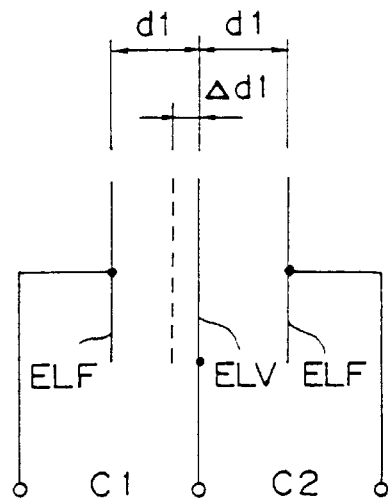
FIGS. 4A through 4C show the problem with the conventional technology.
Figure 4B:
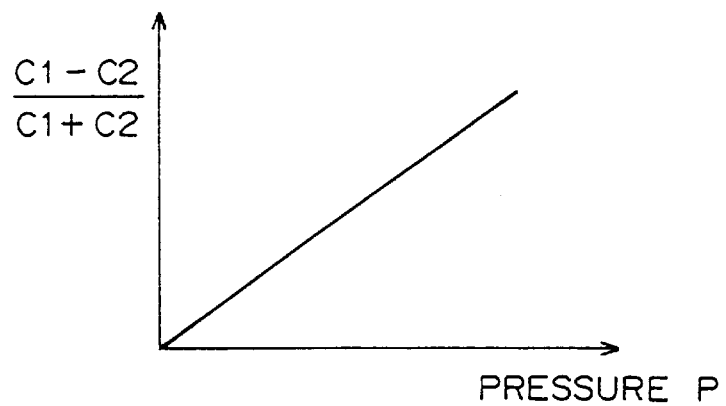
Figure 4C:
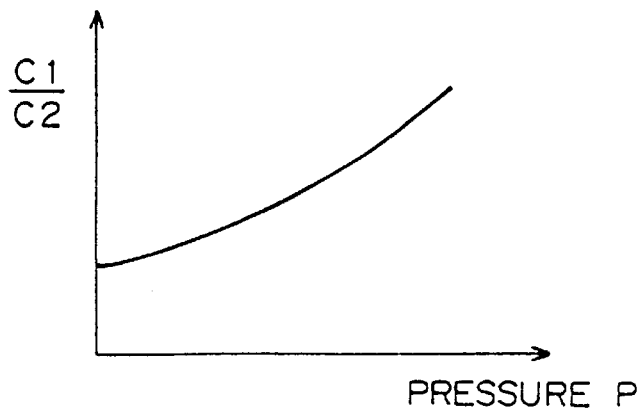

A base 48 is provided to fix the pressure detecting unit 30 (the pressure detecting unit 1 corresponds to the pressure detecting unit 30 according to the present embodiment) to the body of, for example, the pressure detecting unit 12 shown in FIG. 2. An insulation plate 49 insulates the electrode 39b from the base 48. The electrode 39b is connected to the insulation plate 49, and the insulation plate 49 is connected to the base 48 by a well-known conventional technology. An aperture 50 is provided to connect the silicon substrate 31 to the ground. An electrode 51 is provided by the spatter method, etc. inside the aperture 50 such that the electrode 51 is connected to the silicon substrate 31 as shown in FIG. 5. Thus, the silicon substrate 31 is connected to the ground.

In pressure measurement, pressures P1 and P2 are applied from both sides (upward and downward) to the pressure detecting unit 30. The levels of the pressures P1 and P2 are arbitrary, but the following explanation relates to an example case where P2>P1.

When the pressures P1 and P2 (P2>P1) are applied to both sides of the pressure detecting unit 30, the differential pressure moves the diaphragm 32 in the direction indicated by the arrow. The movement of the diaphragm 32 is computed by detecting the capacitances C1 and C2 of the capacitors C1 and C2 and substituting the results in the above described equation (1). Through the operation, the displacement and differential pressure can be obtained without an influence of the change due to temperature and pressure in the dielectric constant of the pressure conducting medium filled in the pressure detecting unit 30 including a pressure guide aperture 10, as described above. When pressure is applied, the portion forming part of the side of the space 41 (vacuum space) of the insulation substrate 35a is deformed by the pressure P2, and the capacitance C3 of the capacitor C3 is changed. Accordingly, a signal corresponding to the absolute value of the pressure (P2) is obtained from the capacitor C3. According to this signal, the absolute pressure of the detection signal is amended. As a result, a more accurate measurement can be realized by considering an influence of the deformation of an apparatus by the pressure.

Although the space 41 can be changed by the thermal expansion of the silicon substrate 31 with a temperature change of the apparatus, the pressure sensitivity of the capacitor C3 can be sufficiently improved by appropriately setting the dimensions of the space 41 and insulation substrate 35a. Therefore, the absolute pressure can be detected with high precision without an influence of a temperature change.

Furthermore, the temperature change of the apparatus also changes the dielectric constant of the insulation substrate 35a. Since the material of the insulation substrate such as pyrex glass, etc. normally increases in dielectric constant in proportion to increases in the temperature, the capacitance C4 of the capacitor C4 changes correspondingly. Therefore, measuring the change in the capacitance C4 determines the temperature of the apparatus, thereby realizing the temperature amendment of the pressure.

The insulation substrate 35a may be compressed and made thinner by pressure, but this has little influence on the capacitance and can be ignored. Although the capacitance C4 is influenced by a change in the oil dielectric constant because of the presence of the electric lines of force leaking in the surrounding pressure conducting medium, the problem can be solved by setting the electrode 47 sufficiently far from the end of the insulation substrate 35a. Thus, the influence of the pressure change on the capacitance C4 can be considerably reduced, thereby obtaining an accurate temperature change measurement.

Figure 6:
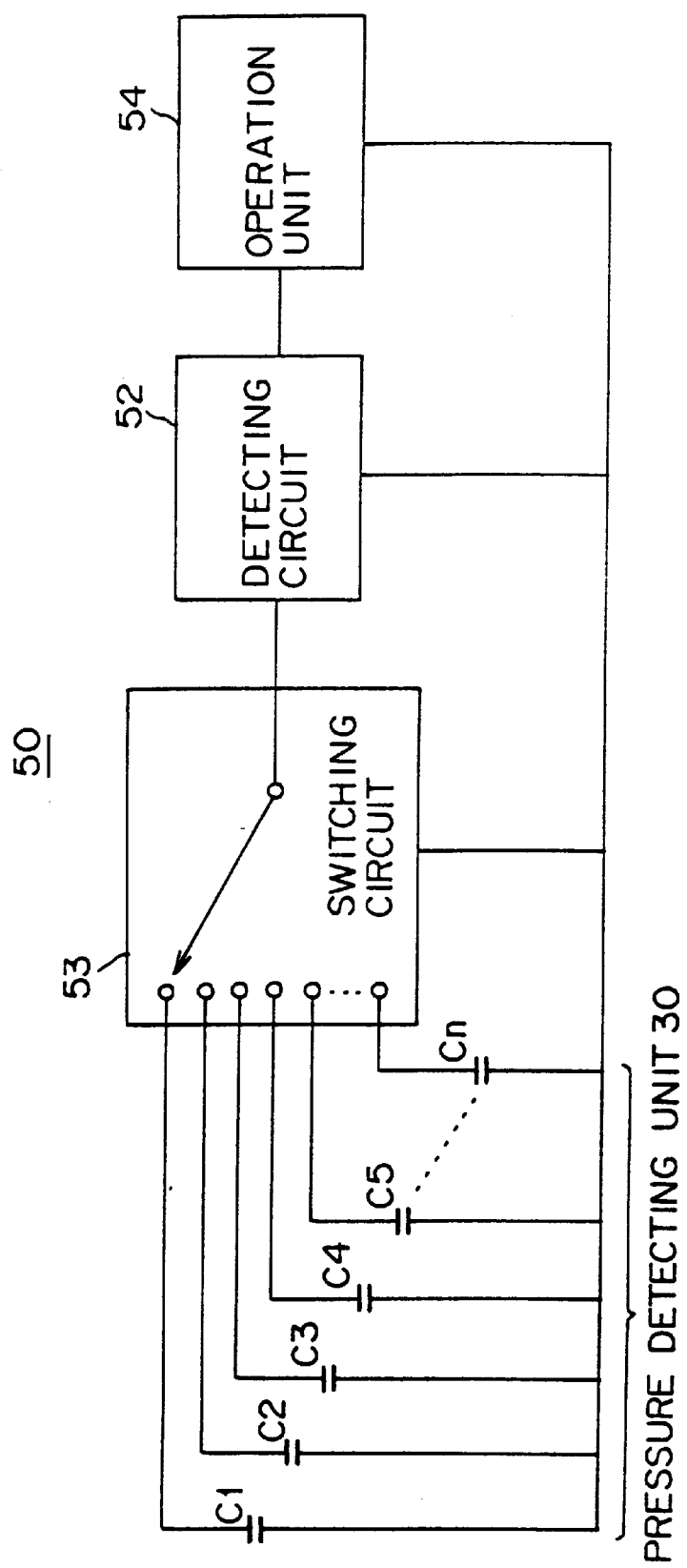
FIG. 6 is a block diagram showing the configuration of the pressure detecting apparatus according to the present invention.

FIG. 6 shows the configuration of a pressure detecting apparatus 50 according to the present invention.

The pressure detecting apparatus 50 comprises a detecting circuit 52, a switching circuit 53, and an operation unit 54. C1 through Cn shown in FIG. 6 are capacitors of the pressure detecting unit according to the present embodiment. The detecting circuit 52 detects the capacitances of the capacitors C1 through C4. The switching circuit 53 switches signals from the capacitors C1 through C4 and transmits them to the detecting circuit 52. The operation unit 54 computes the differential pressures of P1 and P2 based on the detected capacitance of the capacitors C1 and C2, and performs a predetermined amendment operation based on the detected capacitance of the capacitors C3 and C4. Thus, the pressure amendment and temperature amendment for the obtained differential pressure can be successfully made.

Using the switching circuit 53, the apparatus can be produced at a low cost without separately providing a detecting circuit and operating circuit corresponding to each capacitor. In FIG. 5, a plurality of diaphragms or differential pressure detecting units can be provided. Furthermore, a plurality of pressure detecting units can be provided. As a result, the differential detection sensitivity can be further improved and a plurality of differential pressures can be simultaneously detected. In this case, additional output signals of the capacitors C5 through Cn are switched by the switching circuit 53 and transmitted to the detecting circuit 52 and operation unit 54, thereby keeping costs down for the apparatus.

FIG. 7 shows the second embodiment of the pressure detecting unit of the pressure detecting apparatus according to the present invention. In a pressure detecting unit 30', the units also shown in FIG. 5 are assigned the same reference numbers, and the detailed explanation is omitted here.

The pressure detecting unit 30' is different from that shown in FIG. 5 in that the temperature detecting unit 46 is replaced with a temperature detecting unit 46'. The temperature detecting unit 46' comprises the dielectric substrate 55 provided outside (on the top of) the insulation substrate 35a, and electrodes 56a and 56b sandwiching a dielectric substrate 55 between them. The dielectric substrate 55 and the electrodes 56a and 56b form a capacitor C4'. The electrode 56a is connected to the ground through wiring 57a formed on the insulation substrate 35a. The electrode 56b is connected to the switching circuit 53 through wiring 57b formed on the insulation substrate 35a. It is desired that the dielectric substrate 55 is made of, for example, ceramics, etc. having a large dielectric constant and a large temperature-dependency. According to the present embodiment, the material of the capacitor C4' is not limited to that of the diaphragm (silicon according to the first embodiment), thereby successfully obtaining a larger capacitance and temperature sensitivity. The capacitor C4' can also be provided on the insulation substrate 35b.

FIGS. 8A and 8B are a top view and a side view respectively showing another example of the temperature detecting unit 46'.

The temperature detecting unit 46" is different from the temperature detecting unit 46' shown in FIG. 7 in that the electrode of the capacitor C4' is provided on only one side of the dielectric substrate 55 as a pair of comb-shaped electrodes 58a and 58b. The electrodes 58a and 58b are connected and fixed to the wiring 57a and 57b. According to this example, since only a small area of the electrode of the capacitor comes into contact with the pressure conducting medium, the influence of a change in dielectric constant of the pressure conducting medium is very small and the precision of the temperature amendment can be improved. Furthermore, the electrode can be easily produced and implemented, thereby reducing costs. The temperature detecting unit 46" can also be formed on the insulation substrate 35b shown in FIG. 7.

Figure 9:
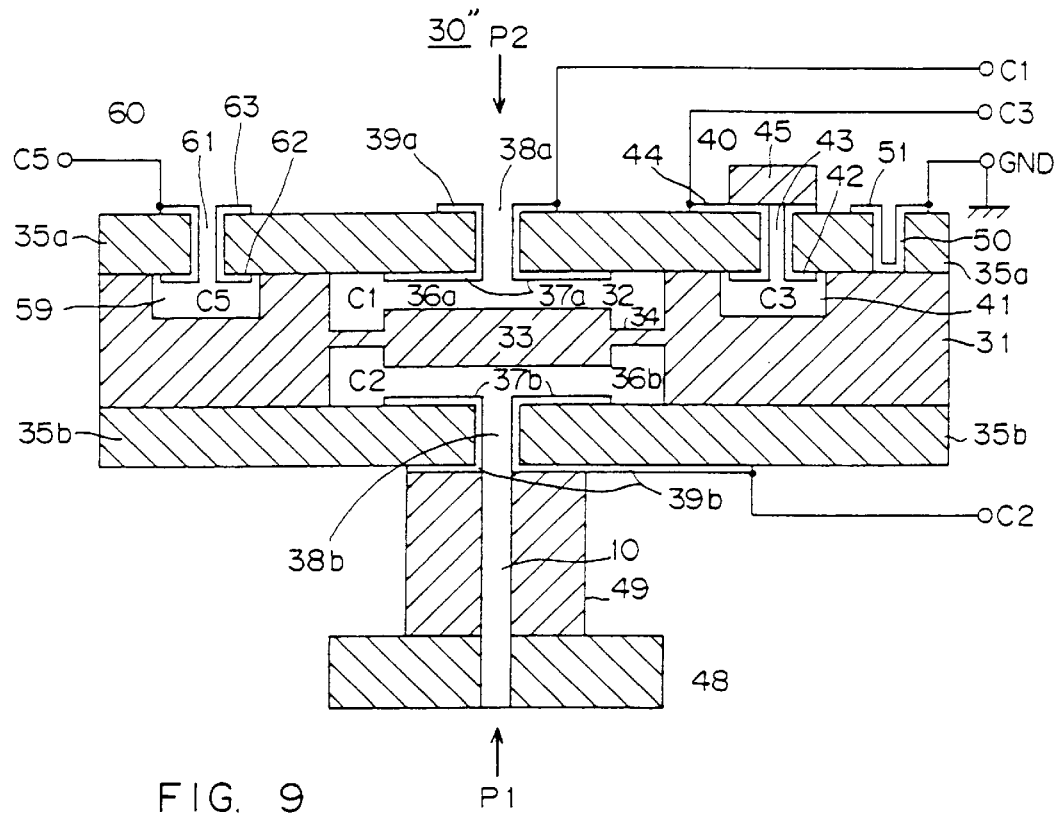
FIG. 9 is a sectional view showing the third embodiment of the pressure detecting unit of the pressure detecting apparatus of the present invention.

FIG. 9 shows the third embodiment of the pressure detecting unit of the pressure detecting apparatus of the present invention. Of the pressure detecting unit 30", the portions also shown in FIG. 5 are assigned the same reference numbers, and the detailed explanation is omitted here.

The pressure detecting unit 30" is different from that shown in FIG. 5 in that a dielectric constant detecting unit 60 replaces the temperature detecting unit 46. The dielectric constant detecting unit 60 is provided with a space 59 generated by processing a silicon substrate 31 by, for example, plasma-etching it to the depth of the flat portion 33 of the diaphragm 32. A electrode 62 is provided on the insulation substrate 35a opposite the silicon substrate 31 in the space 59. An aperture 61 is formed in the insulation substrate 35a to leads the space 59 to an external area. A lead electrode formed inside the aperture 61 connects the electrode 62 to an electrode 63 formed on the outside surface of the insulation substrate 35a. With this configuration, a capacitor C5 is formed between the silicon substrate 31 and electrode 62.

Since a pressure conducting medium is led to the space 59, the insulation substrates 35a and 35b and silicon substrate 31 are not deformed even if the pressure applied around the space 59 alters. Therefore, the capacitance C5 of the capacitor C5 depends on the dielectric constant of the pressure conducting medium between the electrodes. Therefore, the dielectric constant of the pressure conducting medium altering with a change in temperature or pressure can be detected by the capacitance C5. The capacitance C5 may also changes with a deformation caused by high compression force or by expansion or contraction through a temperature change. However, this deformation can be ignored because it is much smaller than the influence of the pressure conducting medium.

On the other hand, since the capacitance C3 does not depend on temperature, but on pressure only, the characteristics depending on temperature only can be obtained through the operations performed based on both capacitances C3 and C5. The present embodiment does not directly detect the temperature as in the first or second embodiment, but obtains the temperature through the operation performed using the capacitances C3 and C5. The function indicating the relationship between the capacitance and temperature depends on the characteristics of a pressure conducting medium. Therefore, the temperature dependency of the capacitances C1 and C2 for obtaining a differential pressure signal is the same as the temperature dependency of the capacitance C5. The dielectric constant of silicon oil used as a pressure conducting medium indicates a non-linear characteristics that the lower the temperature is, the higher the change ratio becomes. On the other hand, according to the first and second embodiments using a dielectric medium in a capacitor, the lower the temperature is, the smaller the change in dielectric constant becomes. As a result, the precision in temperature detection is lower at a lower temperature. However, according to the third embodiment, the precision in pressure detection does not change depending on the temperature because a pressure conducting medium is used between the capacitors.

Figure 10A:
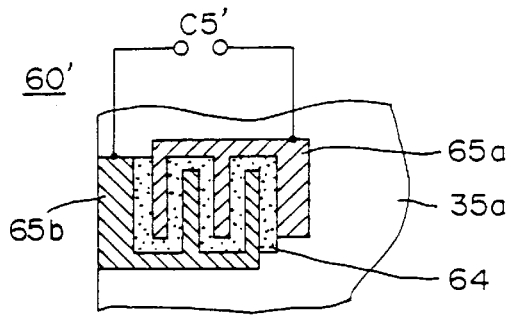
FIGS. 10A and 10B are respectively a top view and a sectional view showing the second example of the dielectric constant detecting unit according to the third embodiment.
Figure 10B:
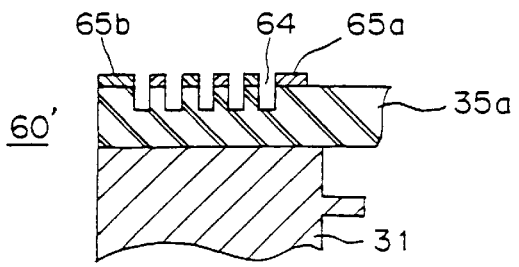

FIGS. 10A and 10B are a top view and a side view respectively showing another example of the dielectric constant detecting unit 60.

The dielectric constant detecting unit 60' is formed using a comb-shaped uneven potion 64 generated by, for example, etching, etc. the outer surface of the insulation substrate 35a. The electrodes 65a and 65b are incorporated in the form of a comb into the uneven portion 64. These two electrodes form a capacitor C5'. The space between the electrodes 65a and 65b is designed to be very small and a groove (concave portion) between them is filled with a pressure conducting medium. Therefore, the capacitance of the capacitor C5' is determined by the dielectric constant of the pressure conducting medium. Since the dielectric constant detecting unit 60' can be generated by only processing the surface of the insulation substrate 35a, it is easily produced at a low cost.

Figure 11:
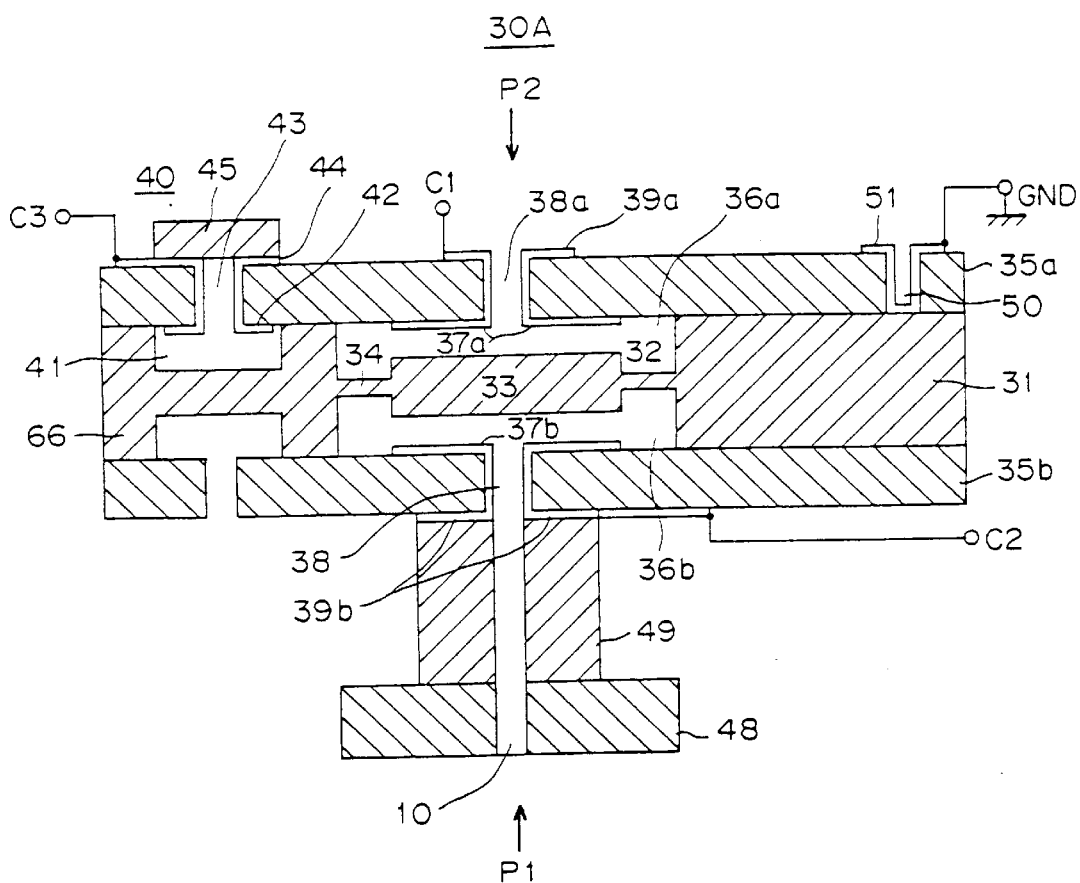
FIG. 11 is a sectional view showing the fourth embodiment of the pressure detecting unit of the pressure detecting apparatus of the present invention.

FIG. 11 shows the fourth embodiment of the pressure detecting unit of the pressure detecting apparatus according to the present invention. In the pressure detecting unit 30A, the units also shown in FIG. 5 are assigned the same reference numbers and the detailed information is omitted here. In the pressure detecting unit 30A, a diaphragm-shaped portion 66 as shown in FIG. 11 is made by, for example, plasma-etching, etc. the silicon substrate 31 for use as the absolute pressure detecting unit 40'. In this example, the silicon substrate 31 is processed in complicated steps. However, since the diaphragm is made of mechanically-strong silicon, it can be easily produced as compared with a diaphragm made of the insulation substrate 35a shown in FIGS. 5 and 9, and the reliability in strength of the apparatus is improved.

The temperature detecting unit and dielectric constant detecting unit shown in FIGS. 5 through 10B are also applicable to the pressure detecting unit 30A.

Figure 12:
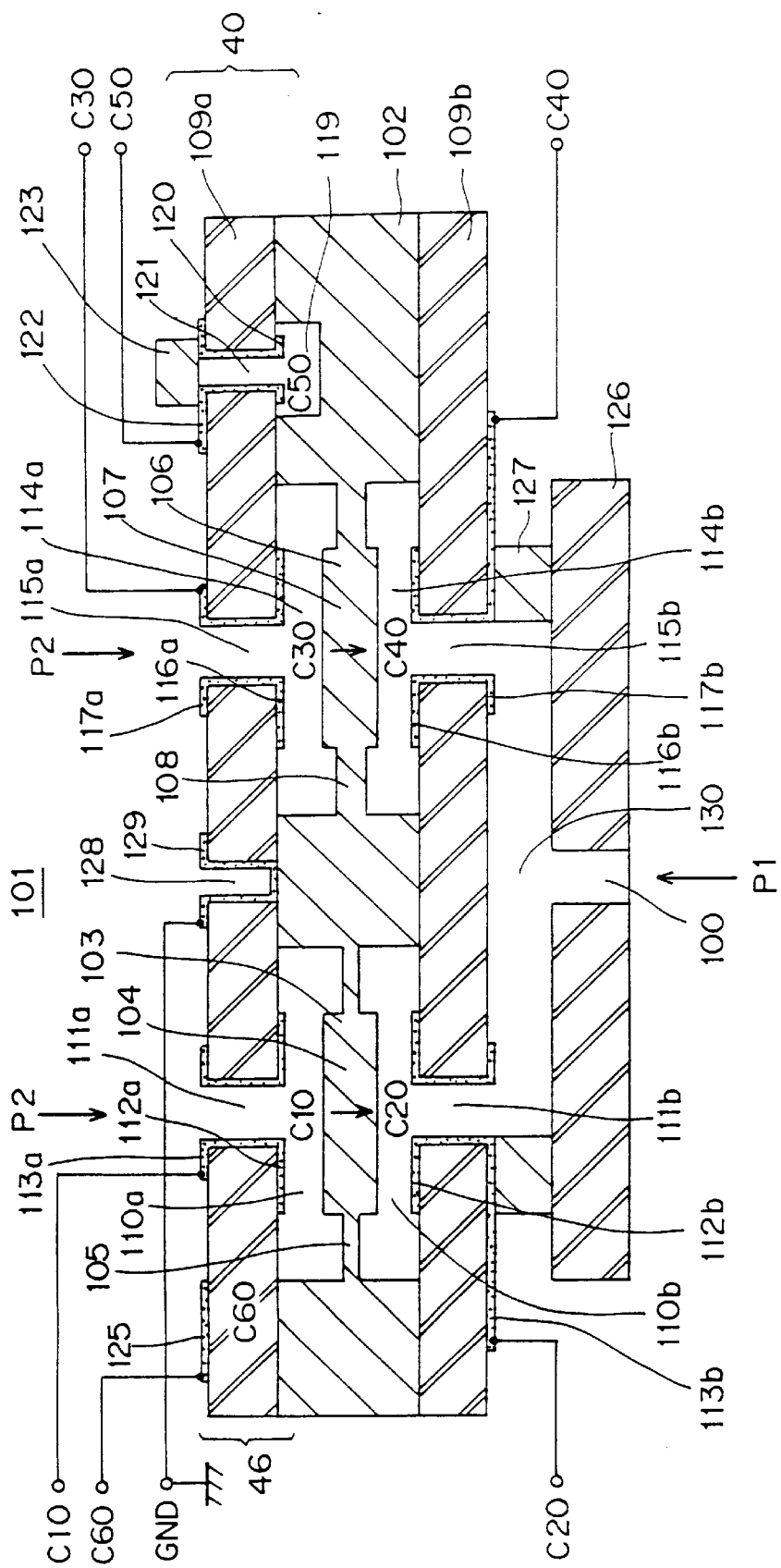
FIG. 12 is a sectional view showing the fifth embodiment of the pressure detecting unit of the pressure detecting apparatus of the present invention.

FIG. 12 shows the fifth embodiment of the pressure detecting unit of the pressure detecting apparatus according to the present invention.

Two diaphragms 103 and 106 are formed in a pressure detecting unit 101 on a silicon substrate 102 by, for example, plasma-etching both sides of the silicon substrate 102. The diaphragms 103 and 106 have, respectively at their centers, flat portions 104 and 107 a little thinner than the silicon substrate 102, and have thin portions 105 and 108 respectively formed circularly on their circumferences. When the diaphragm 103 is used for low pressure and the diaphragm 106 is used for high pressure, the thin portion 105 is made thinner than the thin portion 108. The thin portions are designed to have an optimum thickness depending on the applicable pressure range. Insulation substrates 109a and 109b are made of insulating material having a thermal expansion coefficient equal to that of the silicon substrate 102, such as pyrex glass, etc. They are connected to both sides of the silicon substrate 102 by a static bonding method, etc. such that the bonded portions are closely connected. As a result, spaces 110a and 110b, and spaces 114a and 114b are formed on both sides of the diaphragms 103 and 106 respectively.

Fixed electrodes 112a and 112b are formed opposite the flat portion 104 of the diaphragm 103 on the insulation substrates 109a and 109b by applying two layers of Cr and Au in the spatter method, etc. as shown in FIG. 12. Similarly, fixed electrodes 116a and 116b are formed opposite the flat portion 107 of the diaphragm 106 on the insulation substrates 109a and 109b. Therefore, a capacitor is formed between each fixed electrode and diaphragm. Capacitors (and capacitances) C10 and C20 are between the diaphragm 103 and the fixed electrodes 112a and 112b respectively. Capacitors (and capacitances) C30 and C40 are between the diaphragm 106 and the fixed electrodes 116a and 116b respectively. The capacitors C10, C20, C30, and C40 function as pressure sensors L and H (refer to FIG. 13). Pressure-guide apertures 111a, 111b, 115a, and 115b connect the spaces 110a and 110b and the spaces 114a and 114b to external areas and conduct the external pressures P1 and P2 to the diaphragms. Electrodes 113a, 113b, 117a, and 117b are provided on the inner surfaces of the pressure-guide apertures 111a, 111b, 115a, and 115b and at the portions surrounding the pressure-guide apertures 111a, 111b, 115a, and 115b of the outer surfaces of the insulation substrates 109a and 109b by the spatter method, etc. as shown in FIG. 12. These electrodes are electrically connected to the fixed electrodes 112a, 112b, 116a, and 116b respectively.

Space (vacuum space) 119 is provided in the silicon substrate 102 having the same depth as the flat portions 104 and 107 of the diaphragm, by plasma-etching. An electrode 120 is provided as shown in FIG. 12 on the insulation substrate 109a opposite the space 119, and a capacitor C50 is formed between the electrode 120 and silicon substrate 102. The electrode 120 is led to an electrode 122 provided on the outer surface of the insulation substrate 109a through a lead electrode formed inside an aperture 121 of the insulation substrate 109a. An insulation substrate 123 is provided on the electrode 122 such that the aperture 121 and space 119 can be completely sealed. The insulation substrate 123 is bonded in a vacuum atmosphere by a diffusion bonding method, etc., and keeps the space 119 in a vacuum. The insulation substrate 123 can be made of a substance other than an insulation material. With the configuration around the space 119 including the capacitor C50, the absolute pressure detecting unit 40 can be realized.

An electrode 125 is provided on the outer surface of the insulation substrate 109a. The electrode 125 and silicon substrate 102 form a capacitor C60 containing the insulation substrate 109a between them. With this configuration, the temperature detecting unit 46 has a function similar to that of the temperature detecting unit shown in FIG. 5.

A base 126 fixes the pressure detecting unit 101 to the inside of the body of the pressure detector 12 as shown in FIG. 2. An insulation plate 127 fixes the electrodes 113b and 117b after insulating them from the base 126, and forms a pressure port 130 for transmitting the pressure P1 to the pressure-guide apertures 111b and 115b by tightly fixing the electrodes 113b and 117b. An aperture 128 extending to the silicon substrate 102 is provided on the insulation substrate 109a. An electrode 129 is formed on the inner surface of the aperture by the spatter method, etc. as shown in FIG. 12. The silicon substrate 102 is grounded through the electrode 129.

The operations of the pressure detecting unit are described below by referring to an example in which P1<P2 where P1 and P2 are pressures applied to the apparatus.

When the pressures P1 and P2 (P2>P1) are applied from both sides of the pressure detecting unit 101, the diaphragms 103 and 106 are moved by the differential pressure in the direction indicated by the arrow. The capacitances C10 and C20 of the capacitors C10 and C20 (sensor L) and the capacitances C30 and C40 of the capacitors C30 and C40 (sensor H) are detected by a detecting circuit 132, described later. Then, operations are performed by an operation circuit 133 according to the following equations (7) and (8) to compute the movements of the respective diaphragms.

$$(C10-C20)/\{(C10+C20)-2Cs1\}=\Delta 1/d1 \tag{7}$$

where Δ1: displacement of the diaphragm 103
    d1: space between the diaphragm 103 and fixed electrodes 112a and 112b
    Cs1: parasitic capacitance generated between the conductors of the portions other than electrodes of the sensor L $$(C30-C40)/\{(C30+C40)-2Cs2\}=\Delta 2/d2 \tag{8}$$

where Δ2: displacement of the diaphragm 106
    d2: space between the diaphragm 106 and fixed electrodes 116a and 116b
    Cs2: parasitic capacitance generated between the conductors of the portions other than electrodes of the sensor H The dielectric constant of the pressure conducting medium (for example, silicon oil) which fills the pressure detecting unit 101 and transmits the pressures P1 and P2 alters with temperature and pressure. However, the influence of the temperature and pressure can be removed by performing operations according to the above described equations (7) and (8).

When a pressure is applied, the portion forming the space (vacuum space) 119 of the insulation substrates 109a and 109b is deformed by the pressure P2, thereby changing the capacitance C50 of the capacitor C50. Therefore, the absolute pressure detecting unit 40 functions as an absolute pressure sensor because a signal corresponding to the absolute value of the pressure (P2) can be obtained from the capacitor C30.

When the apparatus receives a temperature change, the size of the space 119 may be changed by the thermal expansion of the silicon substrate 102. However, since the pressure sensitivity of the capacitor C50 can be made sufficiently high by appropriately setting the dimensions of the space 119 and the thickness of the insulation substrate 109a, the absolute pressure can be detected with high precision without influence from a temperature change.

Furthermore, the temperature change of the apparatus also changes the dielectric constant of the insulation substrate 109a. The material of the insulation substrate, for example, pyrex glass, normally increases in dielectric constant in proportion to an increase in temperature. With the increase in the dielectric constant, the capacitance of the capacitor C60 changes. Therefore, measuring the change in the capacitance determines the temperature of the apparatus, thereby realizing the temperature amendment of the pressure.

It can be assumed that the insulation substrate 109a is compressed and made thinner by the pressure. However, it has little influence on the capacitance and can be ignored. The capacitance C60 receives an influence from a change in oil dielectric constant because of the presence of the electric lines of force leaking in the surrounding pressure conducting medium. This is suppressed by setting the electrode 125 sufficiently far from the end of the insulation substrate 109a. Thus, the influence of the pressure change on the capacitance C60 can be considerably reduced thereby obtaining an accurate temperature change measurement.

Figure 13:
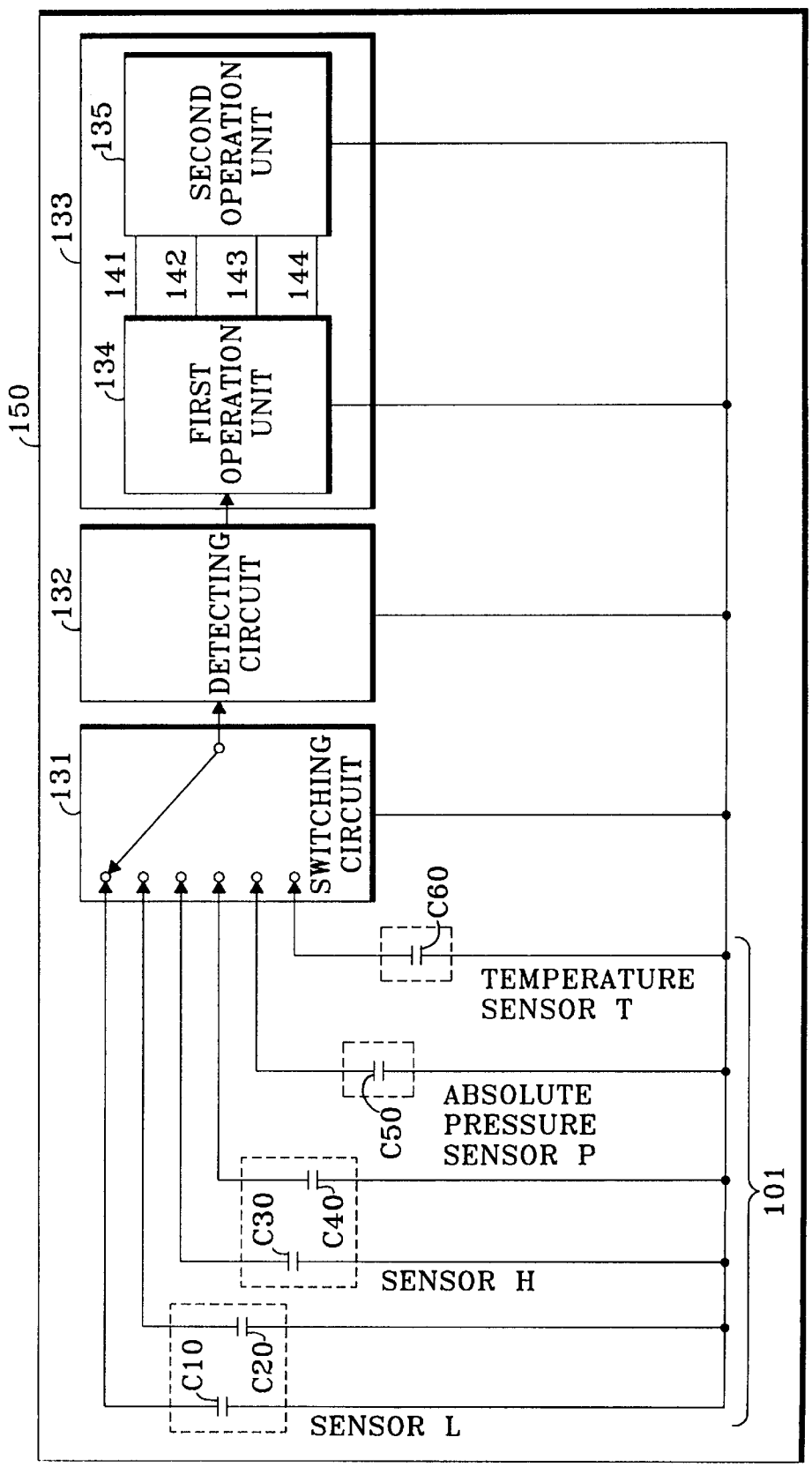
FIG. 13 is a block diagram showing the configuration of the pressure detecting apparatus corresponding to the fifth embodiment.

FIG. 13 is a block diagram showing the configuration of the pressure detecting apparatus corresponding to the pressure detecting unit 101 according to the present invention.

A pressure detecting apparatus 150 is provided with a switching circuit 131, a detecting circuit 132, and an operation circuit 133. The operation circuit 133 is provided with a first operation unit 134 and a second operation unit 135. The capacitors C10 through C60 shown in FIG. 13 correspond to respective capacitors of the pressure detecting unit 101 shown in FIG. 12. The detecting circuit 132 detects the capacitances of the capacitors C10 through C60. The switching circuit 131 switches the signal from the capacitors C10 through C60 and transmits them to the detecting circuit 132.

The first operation unit 134 of the operation circuit 133 determines the displacement indicated by the diaphragm 103 according to the above described equation (7) based on the detected capacitances of the capacitors C10 and C20, and outputs a corresponding sensor L signal 141 to the second operation unit 135. The first operation unit 134 also obtains the displacement indicated by the diaphragm 106 according to the above described equation (8) based on the detected capacitances of the capacitors C30 and C40, and outputs a corresponding sensor H signal 142 to the second operation unit 135. Furthermore, the first operation unit 134 transmits signals corresponding to the detection signals of the capacitors C50 and C60 as an absolute pressure sensor signal 143 and a temperature sensor signal 144 to the second operation unit 135. The second operation unit 135 determines the pressure and amendment values according to these signals.

Figure 14:
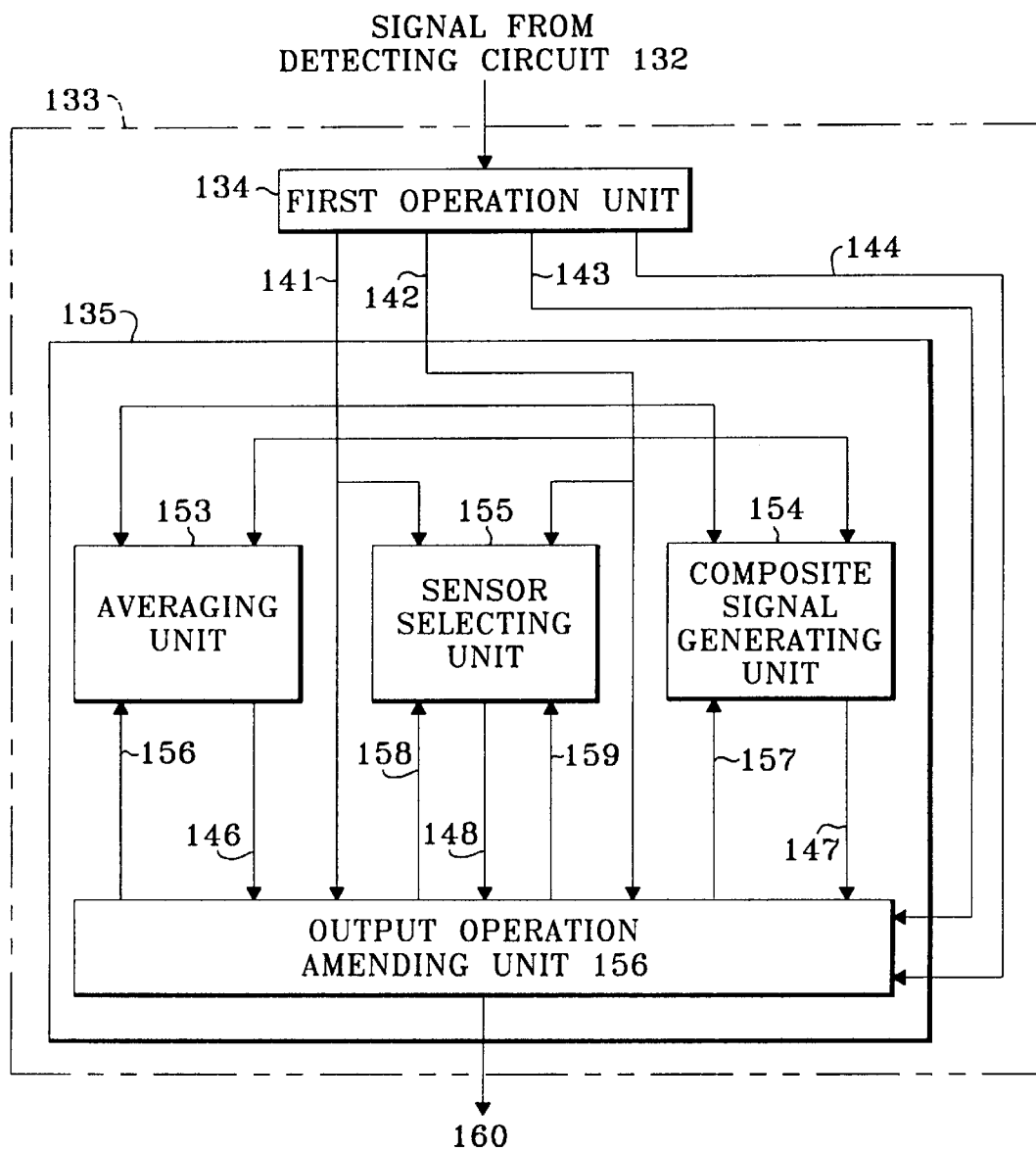
FIG. 14 is a block diagram showing the configuration of the operating circuit of the pressure detecting apparatus according to the present invention.

FIG. 14 is a block diagram showing the configuration of the operation circuit 133.

As shown in FIG. 14, the second operation unit 135 of the operation circuit 133 comprises an averaging unit 153, a composite signal generating unit 154, a sensor selecting unit 155, and an output operation amending unit 156. The sensor L signal 141 and sensor H signal 142 output from the first operation unit 134 are transmitted to the averaging unit 153, composite signal generating unit 154, sensor selecting unit 155, and output operation amending unit 156, and the absolute pressure sensor signal 143 and temperature sensor signal 144 are transmitted to the output operation amending unit 156.

Figure 15:
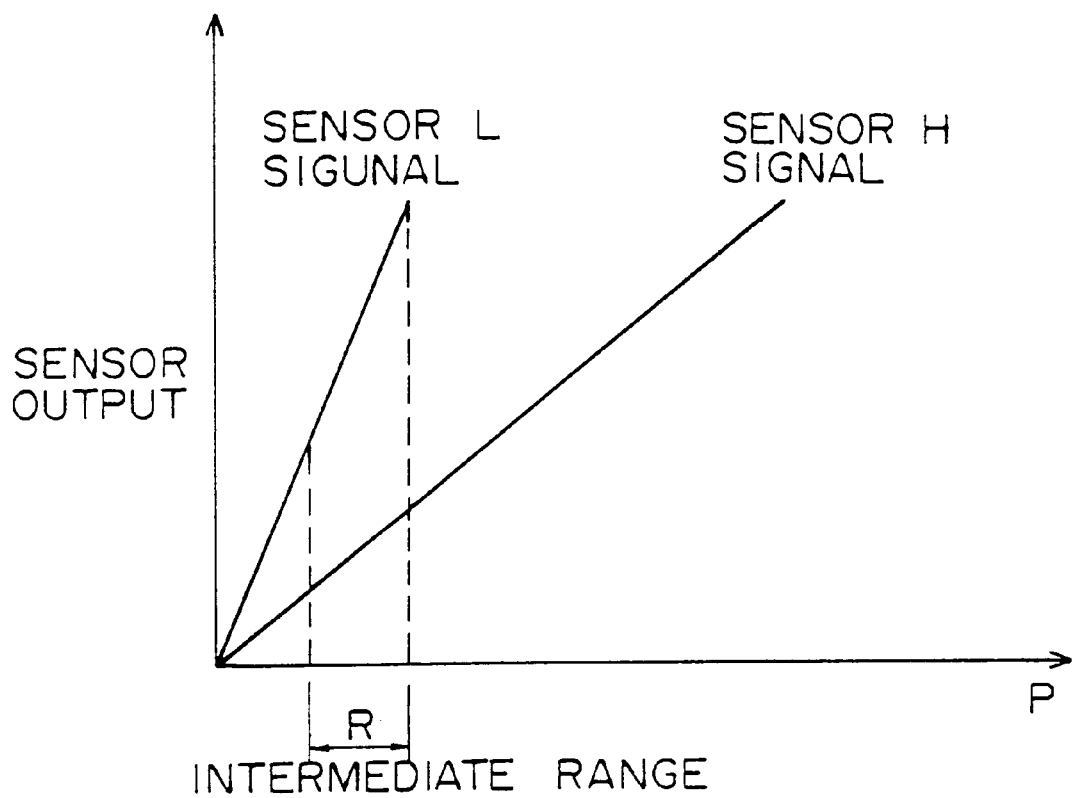
FIG. 15 is a graph indicating the relationship between a sensor output signal and pressure.

The sensor L works over a low pressure range while the sensor H works over the entire operating range from a low pressure range to a high pressure range. Since the sensors L and H generate different output signals in response to the same pressure, the sensor L signal 141 and sensor H signal 142 also indicate different signals in response to the same pressure. FIG. 15 shows the relationship between the pressure P and the sensor L signal 141 and sensor H signal 142.

The output operation amending unit 156 outputs a signal indicating the pressure detection result as an output signal 160. In the process of obtaining the output signal, one of the averaging unit 153, composite signal generating unit 154, and sensor selecting unit 155 is selected depending on the measurement mode selected from among a plurality of measurement modes to obtain the output signal 160 using a signal from the selected unit, absolute pressure sensor signal 143, and temperature sensor signal 144.

Described below are the operations performed by the averaging unit 153, sensor selecting unit 155, and composite signal generating unit 154 selected corresponding to each measurement mode.

FIG. 16 is a block diagram showing the configuration of the averaging unit 153. As shown in FIG. 16, the averaging unit 153 comprises an averaging portion 171, an adding unit 172, and an output unit 173.

Figure 17:
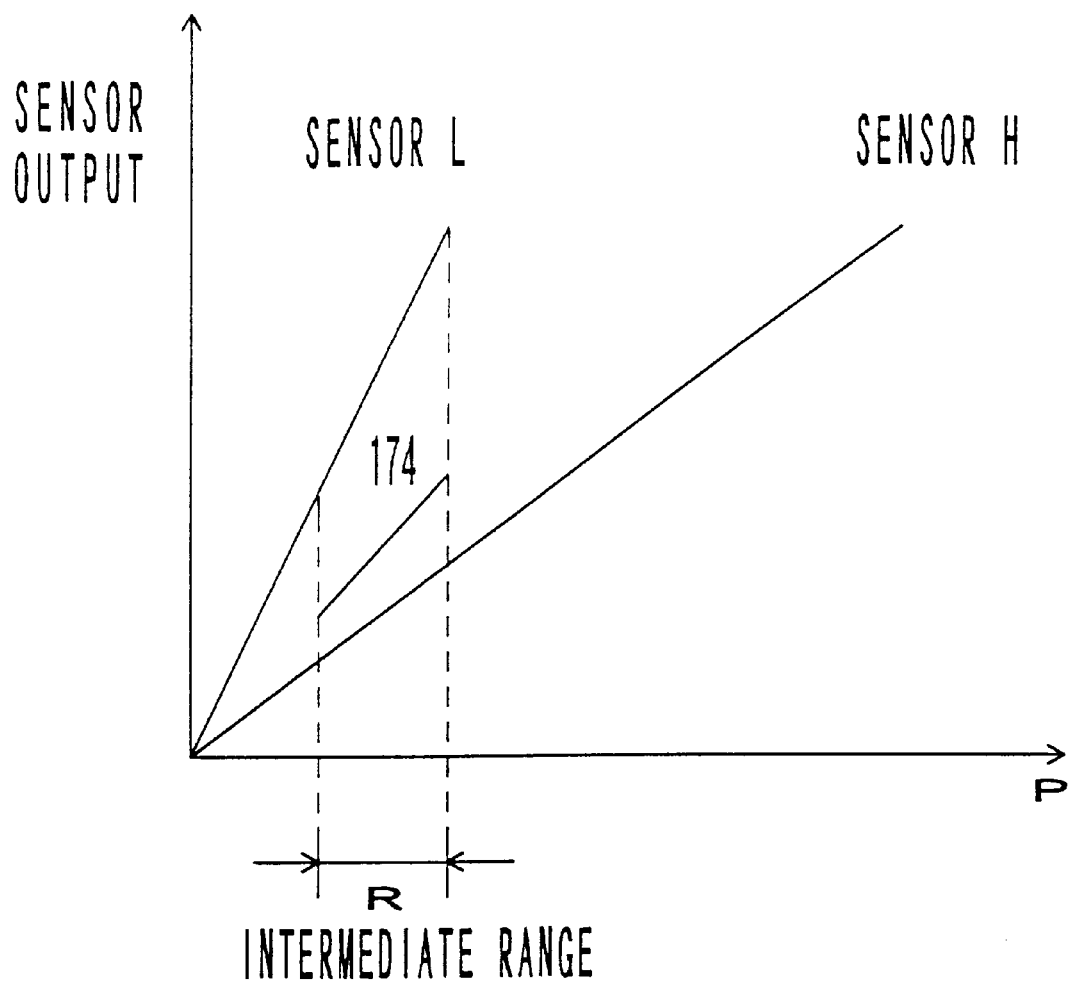
FIG. 17 is a graph indicating the relationship between a sensor output signal and pressure for use in explaining the averaging process according to the present invention.

In detecting pressure in a range (intermediate range R shown in FIG. 15) where measurement ranges of the sensors L and H overlap, the averaging unit 153 is selected according to a control signal 30 from the output operation amending unit 156 when an operation is performed according to a signal obtained by averaging the outputs of the sensors. At this time, the averaging portion 171 of the averaging unit 153 performs a process of reducing both sensor L signal 141 and sensor H signal 142 by half. Then, these signals are added in the adding unit 172. As a result, an averaging signal shown by reference number 174 as shown in FIG. 17 is obtained, and is transmitted to the output operation amending unit 156 through the output unit 173. In this example, averaging processes are performed throughout the intermediate range R. However, the averaging process can be performed in only a part of the range. Thus, an averaging process can be selected according to a control signal 151 from the output operation amending unit 156. As a result, measurement can be flexibly performed with high precision.

FIG. 18 is a block diagram showing the configuration of the sensor selecting unit 155. As shown in FIG. 18, the sensor selecting unit 155 comprises a comparison and determination unit 175 and a control signal output unit 176.

When the most appropriate signal is selected for use in operations from the two sensor outputs 141 and 142, the sensor selecting unit 155 is selected according to a control signal 158 from the output operation amending unit. At this time, a 1-bit mode selection signal 159 determines which sensor output should be selected. The comparison and determination unit 175 selects a desired sensor output according to the mode selection signal 159. The selected sensor output signal is transmitted to the output operation amending unit 156 as a selection signal 148 through the control signal output unit 176. Thus, an appropriate sensor output signal can be selected according to the control signal 158 and selection signal 159 from the output operation amending unit 156, and high-precision measurement can be realized.

Figure 19:
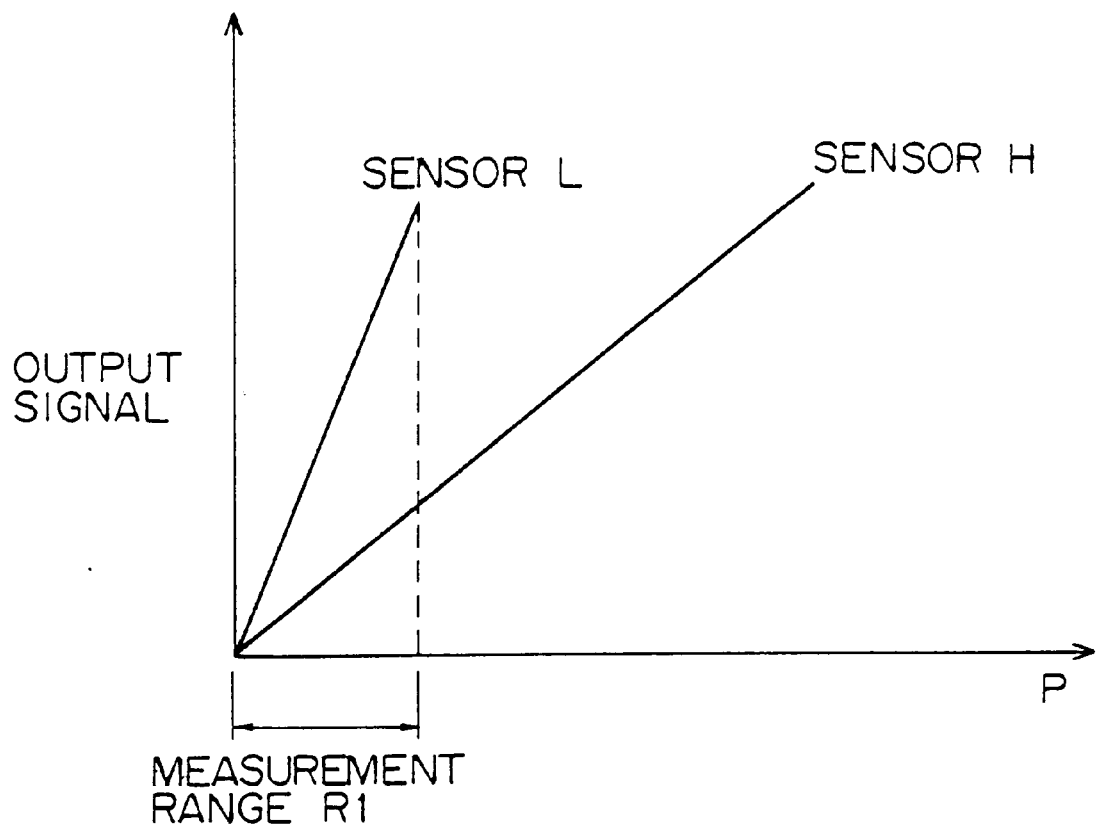
FIG. 19 is a graph indicating the relationship between an output signal and pressure for use in explaining a signal output by the sensor selecting unit.

FIG. 19 is a graph indicating a signal output from a sensor selecting unit 155, and indicates that the output of the sensor L is selected within the measurement range R1.

Figure 20:
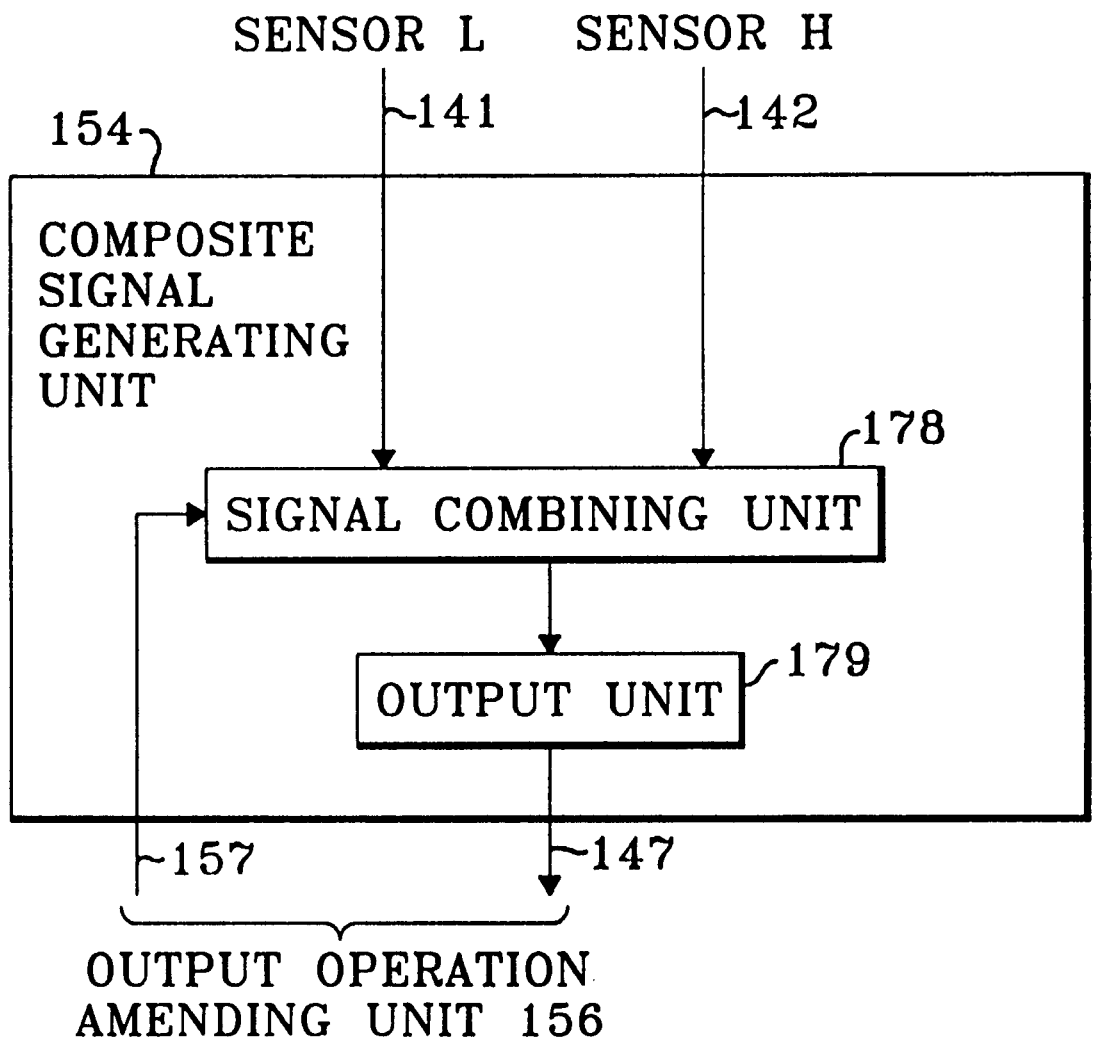
FIG. 20 is a block diagram showing the configuration of the composite signal generating unit of the operating circuit according to the present invention.

FIG. 20 is a block diagram showing the configuration of the composite signal generating unit 154. As shown in FIG. 20, the composite signal generating unit 154 comprises a signal combining unit 178 and an output unit 179.

When a control signal 157 is provided from the output operation amending unit 156 to the composite signal generating unit 154, the composite signal generating unit 154 combines through the signal combining unit 178 a sensor output with the outputs from the sensors L and H preliminarily combined into a composite signal and stored in a memory, etc. The composite signal is then output through the output unit 179. Since the sensor output signal can be processed after being specified according to the control signal 157 from the output operation amending unit 156, high-precision measurement can be flexibly performed.

Figure 21:
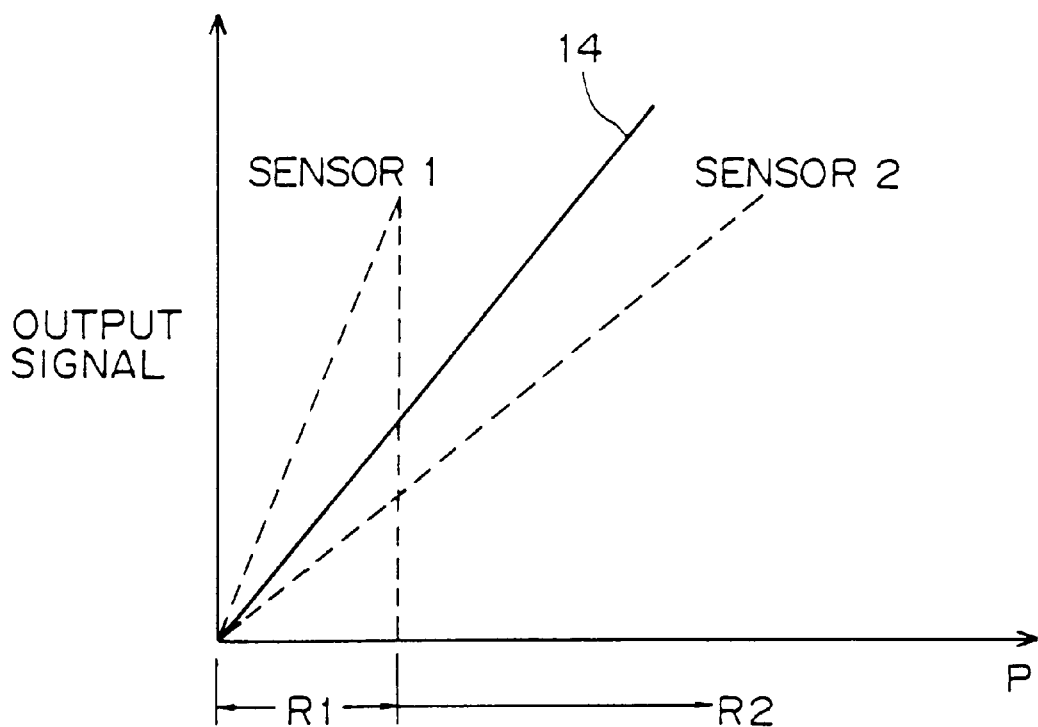
FIG. 21 is a graph indicating the relationship between an output signal and pressure for use in explaining a signal output by the composite signal generating unit.

FIG. 21 is a graph showing the characteristics of the signal output from the composite signal generating unit 154. 14 in FIG. 21 indicates a composite signal generated through a method of, for example, vector addition, weighting, or arithmetical addition based on the signals from sensors L and H obtained under ideal conditions. The composite signal 14 is stored in a memory, or the like, in advance. Broken lines indicated by SENSOR 1 and SENSOR 2 correspond to signals actually obtained by the pressure detecting apparatus of the present invention in a real measuring field.

As shown in this graph, the composite signal generating unit 154 generates the composite signal through the method of, for example, vector addition, weighting, or arithmetical addition using the signal from sensors L (SENSOR 1) and the signal 14 in the measurement range R1, and outputs the composite signal as a measuring result. In the measurement range R2, the composite signal generating unit 154 generates the composite signal through the same method using the signal from sensors H (SENSOR 2) and the signal 14, and output it as the measuring result.

If there is only one sensor (for example, using the apparatus shown in FIGS. 5 through 11), a composite signal by the output signal of the sensor and the signal 14 is output as the measuring result over the entire measurement range.

Described next are an initial amendment and external amendments to processes on a detection signal. These processes are performed by the output operation amending unit 156 of the second operation unit. Characters used in each equation are defined as follows.

T1, T2: values corresponding to C1 and C2
A: initial amendment coefficient
B: initial amendment coefficient
PN: output value of pressure after initial amendment
PF: ratio (%) of output value of pressure after initial amendment
PNZ: value of PF when pressure P is zero (0%)
PNS: value of PF when pressure P is span (100%)
F: output value of pressure PN after setting a range and external amendment
RNZ: zero-setting coefficient when a range is set
RNS: span-setting coefficient when a range is set
KZ: zero-adjusting coefficient when external amendment
KS: span adjustment coefficient when external amendment PN, PF, and F are represented as follows.

$$PN = (T1 - T2 - A)/(T1 - T2 - B) \quad (9)$$

$$PF = 100 \cdot (PN - PNZ)/PNS \quad (10)$$

$$F = 100 \cdot \{PF - (RNZ + KZ)\}/RNS \cdot (1 + KS) \quad (11)$$

Figure 22A:
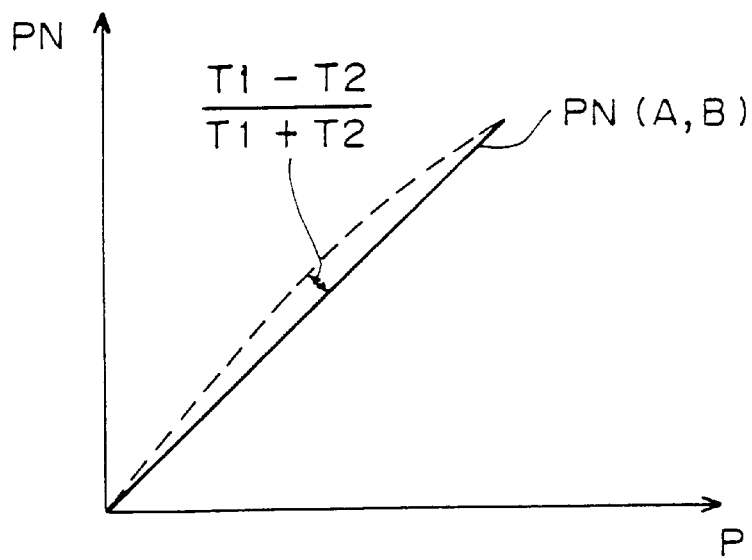
FIGS. 22A and 22B are graphs showing the initial amendment.
Figure 22B:
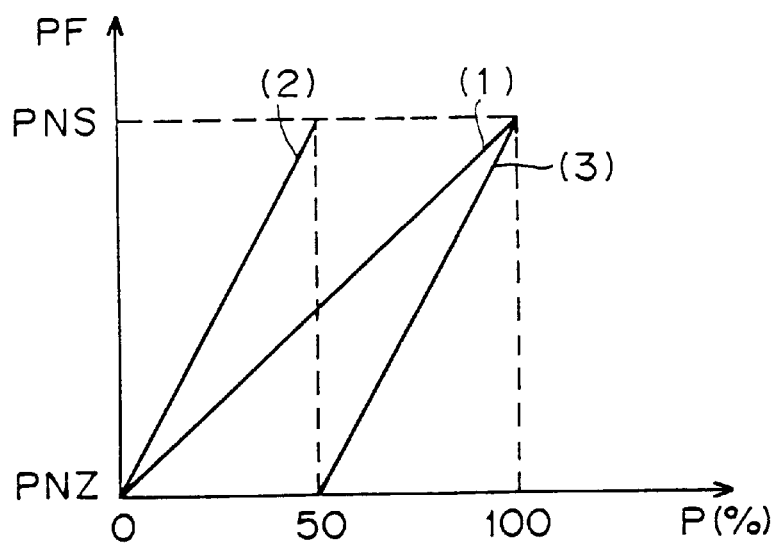
Figure 23A:
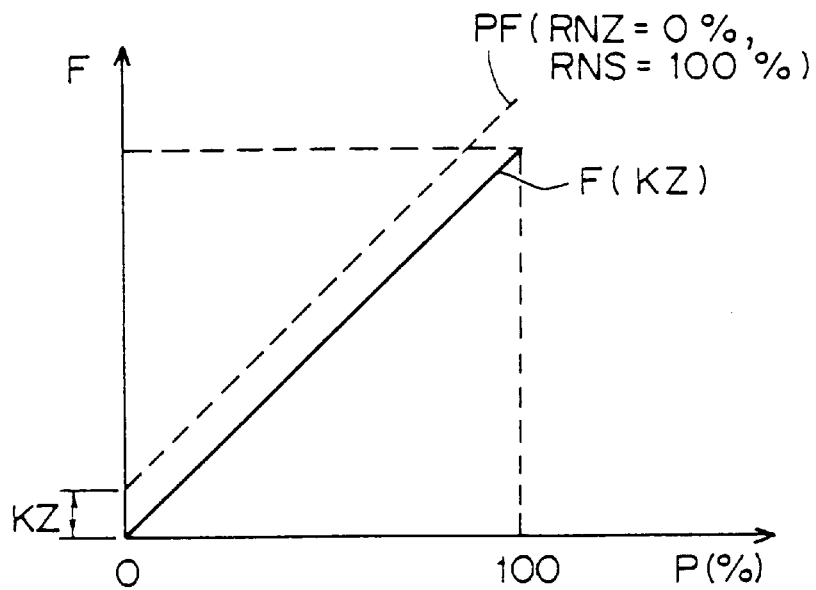
FIGS. 23A and 23B are graphs showing the settings of a range and external adjustment.
Figure 23B:
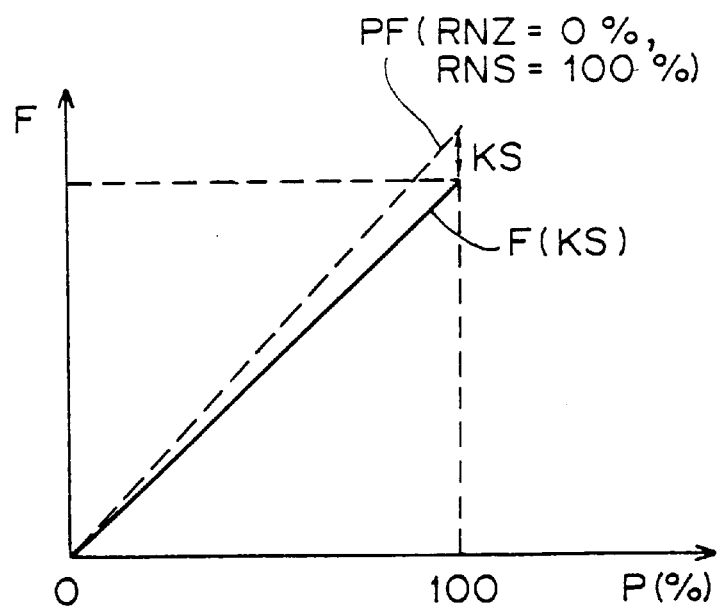

FIGS. 22A and 22B show the relationship between the PN and PF and the pressure P. FIGS. 23A and 23B show the relationship between the F and pressure P.

When the initial amendment is made, the initial amendment coefficients A and B are optimized by the above described equation (9) such that the output PN satisfies a predetermined object value under specified conditions of, for example, temperature, etc. As a result, as shown in FIG. 22A, the output before the amendments (indicated by broken lines) is appropriately amended as indicated by the solid lines. In most cases, it is necessary to optimize the initial amendment coefficients A and B for each sensor. If the characteristics of each sensor are almost identical, the initial amendment coefficient is optimized for only one sensor, and the optimized value is applied to the initial amendment coefficients of other sensors.

When a range is set, the zero-setting coefficient RNZ and the span-setting coefficient RNS are set at an optional pressure based on the above described equations (10) and (11) (refer to FIG. 22B). When a span-setting is selected for a specific sensor, a linearity amendment can be made in a pressure range for other sensors, in addition to the specific sensor, in the range of the pressure P1.

When an external adjustment is made, a zero-adjustment and a span-adjustment are made based on the above described equation (11) by adjusting the zero-adjustment coefficient KZ and span-adjustment coefficient KS when zero or span (100% pressure) is set. FIG. 23A shows the zero-adjustment. FIG. 23B shows the span-adjustment. In most cases, it is necessary to make a zero-adjustment and a span-adjustment for each sensor. If the characteristics of each sensor are almost identical, the amendment should be made for only one sensor, and be applied to other sensors.

Figure 24:
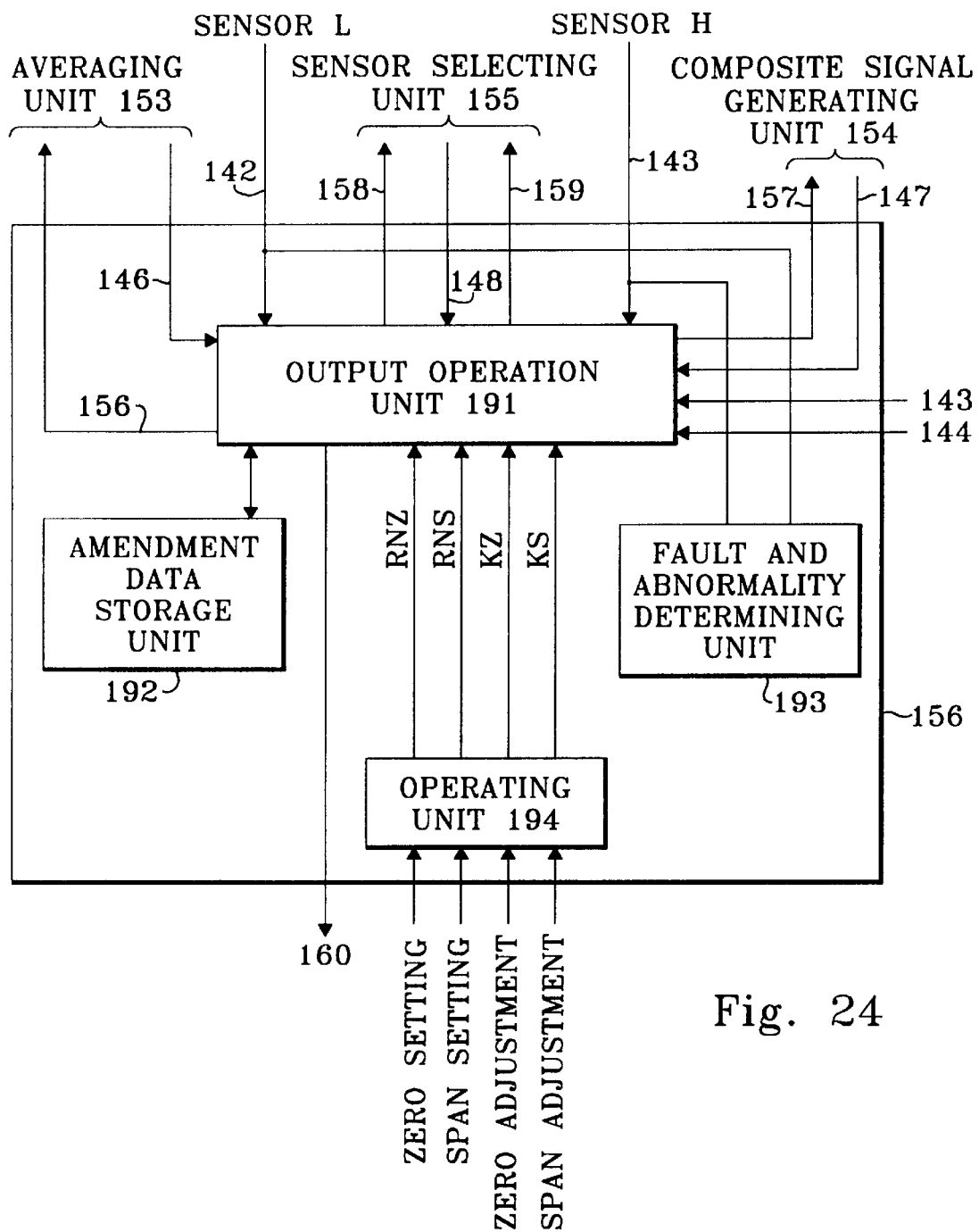
FIG. 24 is a block diagram showing the configuration of the output operation amending unit of the operating circuit according to the present invention.

FIG. 24 is a block diagram showing the configuration of the output operation amending unit 156. As shown in FIG. 24, the output operation amending unit 156 comprises an output operation unit 191, an amendment data storage unit 192, a fault and abnormality determining unit 193, and an operating unit 194.

The output operation unit 191 is formed by microprocessor units (MPU), etc., generates control signals to the averaging unit 153, sensor selecting unit 155, and composite signal generating unit 154, and performs an operation on an output signal based on output signals 142 and 143 of the sensors L and H and signals 146, 148, and 147 received from the units 153, 155, and 154. At this time, an amending operation is performed using the initial amendment coefficients A and B written to the amendment data storage unit 192 comprising a ROM, etc., the output 143 from the absolute pressure sensor 40, and the output 144 from the temperature sensor 46. A range setting and an external adjustment are made by externally changing the zero-setting coefficient RNZ and span-setting coefficient KS for use in setting a range and the zero-adjustment coefficient KZ and span adjustment coefficient KS for use in external adjustment through the operating unit 194. Furthermore, the fault and abnormality determining unit 193 monitors the above described operations and the output of each sensor and unit. If the fault and abnormality determining unit 193 determines that a sensor output is abnormal by comparing it with another sensor output, it generates an alarm signal, transmits an address signal corresponding to the abnormal sensor to the output operation unit 191, and stops the output of the sensor.

Figure 25:
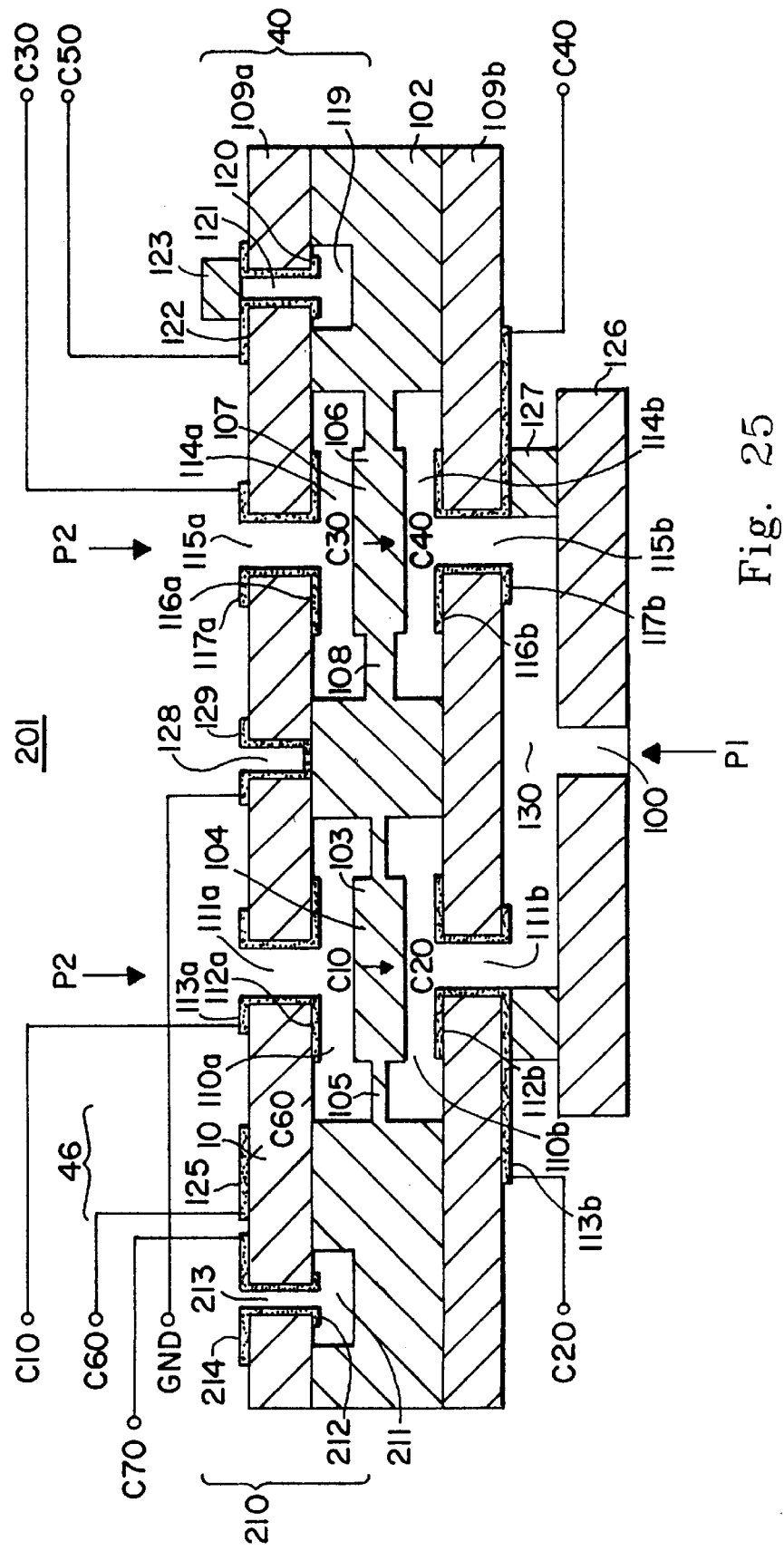
FIG. 25 is a sectional view showing the sixth embodiment of the pressure detecting unit of the pressure detecting apparatus of the present invention.

FIG. 25 shows the sixth embodiment of the pressure detecting unit of the pressure detecting apparatus according to the present invention. In FIG. 25, units also appearing in the fifth embodiment shown in FIG. 12 are assigned the same reference number, and the detailed explanation is omitted here.

A pressure detecting unit 201 according to the sixth embodiment of the present invention is different from the pressure detecting unit 101 according to the fifth embodiment in that the pressure detecting unit 201 comprises a reference capacitance detecting unit 210. The reference capacitance detecting unit 210 comprises a space 211 formed in the silicon substrate 102 and an electrode 212 formed under the insulation substrate 109a at the top of the space 211. The space 211 is formed by plasma-etching the silicon substrate to the depth of the diaphragms 104 and 107. A capacitor C70 (its capacitance is also represented as C70) is formed between the electrode 212 and the silicon substrate 102. An electrode 214 is formed on the top surface of the insulation substrate 109a, and is connected to the electrode 212 through a lead electrode formed inside an aperture 213 in the insulation substrate 109a.

The space 211 is filled with the pressure conducting medium which encompasses the capacitors C10 through C40 and transmits the pressure P1 and P2. Therefore, only a change in dielectric constant of the pressure conducting medium which alters with a change in temperature or pressure is detected by the change in the capacitance of the capacitor C70. The parasitic capacitance of the capacitors C10 through C40 is also affected by a change in the dielectric constant of the pressure conducting medium which alters with temperature and pressure. Therefore, a pure parasitic capacitance without an influence of a change in dielectric constant can be obtained by making an amendment using the capacitance detection result of the capacitor C70. Thus, the reference capacitance detecting unit 210 functions as parasitic capacitance amending capacitor.

The method of measuring a change indicated by a diaphragm and the method of computing pressure through the pressure detecting unit 201 according to the sixth embodiment are the same as those according to the fifth embodiment.

FIG. 26 is a block diagram showing the configuration of the pressure detecting apparatus corresponding to the pressure detecting unit 201 according to the sixth embodiment.

The pressure detecting apparatus comprises the pressure detecting unit 201, a selecting unit 202, a capacitance-frequency converting circuit 203, a counter 204, and a μ-COM operation circuit 205 realized by a microprocessor.

Figure 27:
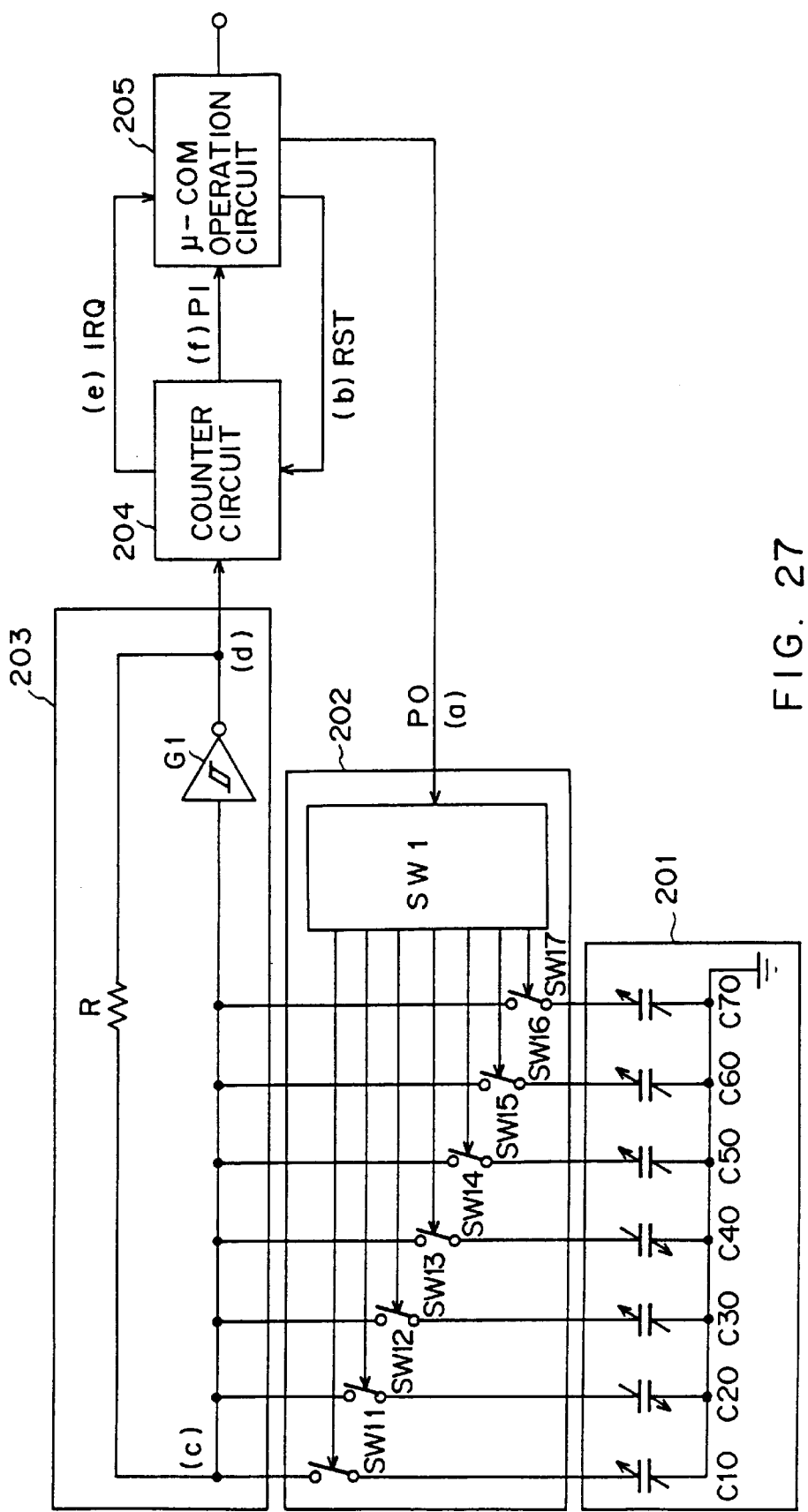
FIG. 27 is a block diagram showing the signal transmitting system of the pressure detecting apparatus according to the present invention.

FIG. 27 is a block diagram showing a signal transmitting system of the pressure detecting apparatus.

As shown in FIG. 27, the signals from the capacitors C10 through C70 of the pressure detecting unit 101 are switched between connected and disconnected states by switches SW11 through SW17 of the selecting unit 202. Each of the switches SW11 through SW17 comprises, for example, a CMOS type transistor. The switch control circuit SW1 controls the opening and closing the switches SW11 through SW17. Under this control, a required signal is selected from among the signals from the capacitors C10 through C70 and is transmitted to the capacitance-frequency converting circuit 203. The capacitance-frequency converting circuit 203 charges and discharges the capacitors C10 through C70, and comprises a resistance (resistor) R and a Schmidt trigger gate G1. The Schmidt trigger gate G1 has two thresholds and inverts an output when the charging or discharging voltage exceeds the threshold levels, thereby generating a pulse signal at a frequency corresponding to the capacitance of each capacitor. The counter circuit 204 counts the pulse signals using a reference clock signal. The μ-COM operation circuit 205 reads the count result and performs a predetermined operation.

Figure 28:
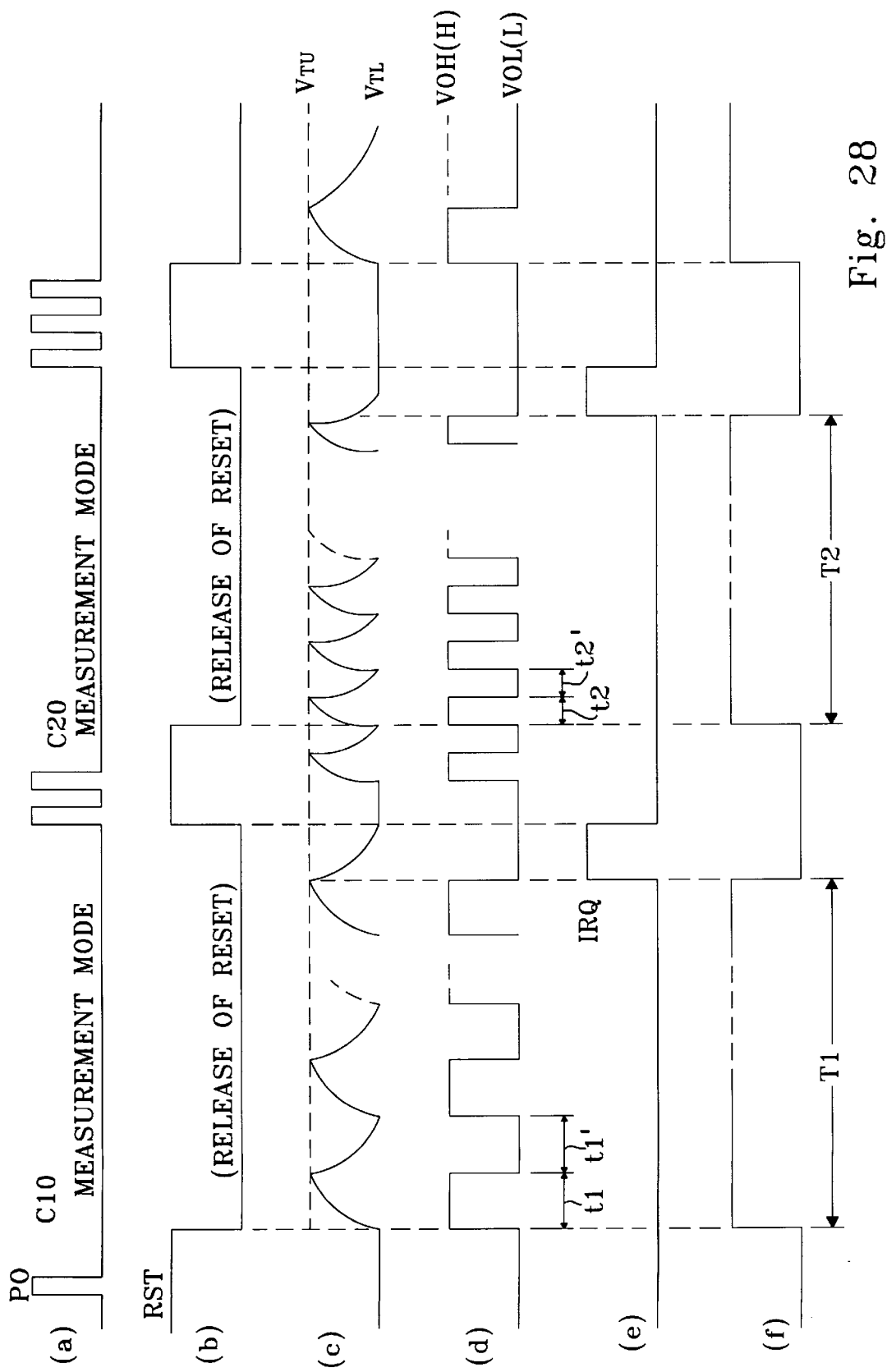
FIG. 28 shows the signal waveforms generated by the pressure detecting apparatus according to the present invention.

Next, the measuring operation of the capacitance of the capacitors C10 through 70 is described by referring to FIG. 28. (a) through (f) in FIG. 28 show the waveforms of signals at the positions indicated by (a) through (f) shown in FIG. 27 respectively.

In an initial state, the μ-COM operation circuit 205 does not output a mode selection signal PO (refer to (a) shown in FIG. 28), and the counter circuit 204 is in a reset state according to the reset signal RST (refer to (b) shown in FIG. 28). When the μ-COM operation circuit 205 provides a mode selection signal PO indicated in (a) shown in FIG. 28, the switch control circuit SW1 turns on the switch SW11 and selects the capacitor C10, and an oscillating circuit is formed by the resistor R, capacitor C10, and gate G1. If the input to the gate G1 indicates a low (L) level, the output from the gate G1 indicates a high (H) level ($V_{OH}$), thereby charging the capacitor C10 through the resistor R. When the charging voltage of the capacitor C10 reaches (or exceeds) the higher voltage ($V_{TU}$) of the two thresholds, the output from the gate G1 is inverted to the L level ($V_{OL}$), thereby discharging the electric charge accumulated by the capacitor C10 through the resistor R. When the input voltage of the gate G1 falls to the lower value (voltage $V_{TL}$) of the two thresholds, the output of the gate G1 indicates the H level, thereby charging the capacitor C10 again through the resistor R. By repeating the charging and discharging processes, the gate G1 outputs pulse signals at a frequency proportional to the capacitance of the capacitor C10. (refer to (d) in FIG. 28).

The number of pulses of the output pulse signals are counted by the counter circuit 204. When the count value reaches a predetermined number, the counter circuit 204 stops the counting as indicated in (f) by issuing a pulse (count-up signal IRQ) indicated in (e) shown in FIG. 28. The μ-COM operation circuit 205 receives the count-up signal IRQ as an interrupt signal from the counter circuit 204, and reads the count value n as an output P1 at a charging or discharging time T1.

The charging time of the capacitor C10 (capacitance is also represented by C10), the time t1, is computed as follows.

$$V_{TU} - V_{TL} = (V_{OH} - V_{TL})(1 - e^{-t1/R \cdot C10}) \tag{12}$$

and $$t1 = R \cdot C10 \cdot LN\{(V_{OH} - V_{TL})/(V_{TU} - V_{TL})\} \tag{13}$$

where LN indicates a natural logarithm.
The discharging time t1' is similarly computed as follows.

$$V_{TU}-V_{TL}=(V_{OL}-V_{TU})(1-e^{-t1'/R \cdot C10}) \quad (14)$$

and $$t1'=R \cdot C10 \cdot LN\{(V_{OL}-V_{TU})/(V_{OL}-V_{TL})\} \quad (15)$$

Since the time of the charging operations is n−1 for n times of charging as indicated by (d) shown in FIG. 28, the charging time T1 is computed as follows.

$$T1=n \cdot t1+(n-1) \cdot t1' \quad (16)$$

The time of charging is counted plural times because the measurement precision of the time measuring counter should be improved. The time of charging (number of pulses) n can be set to an appropriate value depending on the reference clock frequency, value of resistance R, and capacitance, etc. of a capacitor. According to the present embodiment, n=960.

Next, according to the above equations (13) and (15), the μ-COM operation circuit 205 turns off the switch SW11 and turns on the switch SW12 by controlling the switch control circuit SW1 after computing the charging time t1 from the counted number of pulses n and charging time T1 for the capacitor C10. Similarly, the charging and discharging time T2 of the capacitor C20 and pulse signals are counted to compute the charging time t2. This process is similar to that described above. The right part of FIG. 28 indicates a time chart for this process. Similarly, the charging time is computed for the capacitors C30 through C70.

Based on the obtained charging times, the μ-COM operation circuit 205 performs the following operating process.

The change indicated by the diaphragm is obtained for a low pressure range sensor L comprising the capacitors C10 and C20.

$$(t1-t2)/(t1+t2-t7)=(C10-C20)/(C10+C20-C70) \quad (17)$$

In this case, a measured capacitance contains the parasitic capacitance generated between the conductors other than electrodes in the pressure detecting unit 201. Therefore, with a parasitic capacitance of Cs1, the above described equation (17) is represented as follows.

$$(C10+Cs1-C20-Cs1)/(C10+Cs1+C20+Cs1-C70)=(C10-C20)/ \\ (C10+C20+2Cs1-C70) \quad (18)$$

where, with 2Cs1=C70 (Cref), the influence of the parasitic capacitance is canceled. Thus, a change indicated by the diaphragm can be obtained while canceling the influence of the parasitic capacitance by performing an operation according to the above described equations through the μ-COM operation circuit 205.

For a high pressure range sensor H comprising the capacitors C30 and C40, an operation is made according to the following equations (20) and (21) corresponding to the above described equations (18) and (19).

$$(t3-t4)/(t3+t4-t7)=(C30-C40)/(C30+C40-C70) \quad (19)$$

$$(C30+Cs2-C40-Cs2)/(C30+Cs2+C40+Cs2-C70)=(C30-C40)/ \\ (C30+C40+2Cs2-C70) \quad (20)$$

where Cs2 indicates the parasitic capacitance relating to the high pressure range sensor H.

When temperature and pressure amendments are made, the μ-COM operation circuit 205 selects the capacitor C50 or C60, measures the charging time t4 and t5 proportional to each capacitance in the method similar to that described above, and performs a predetermined amendment process based on the measurement result.

The configuration examples of the pressure detecting apparatus corresponding to the apparatus according to the sixth embodiment shown in FIG. 25 are described below. In the description, the components also appearing in FIG. 27 are assigned the same numbers, and the detailed explanation is omitted here.

Figure 29:
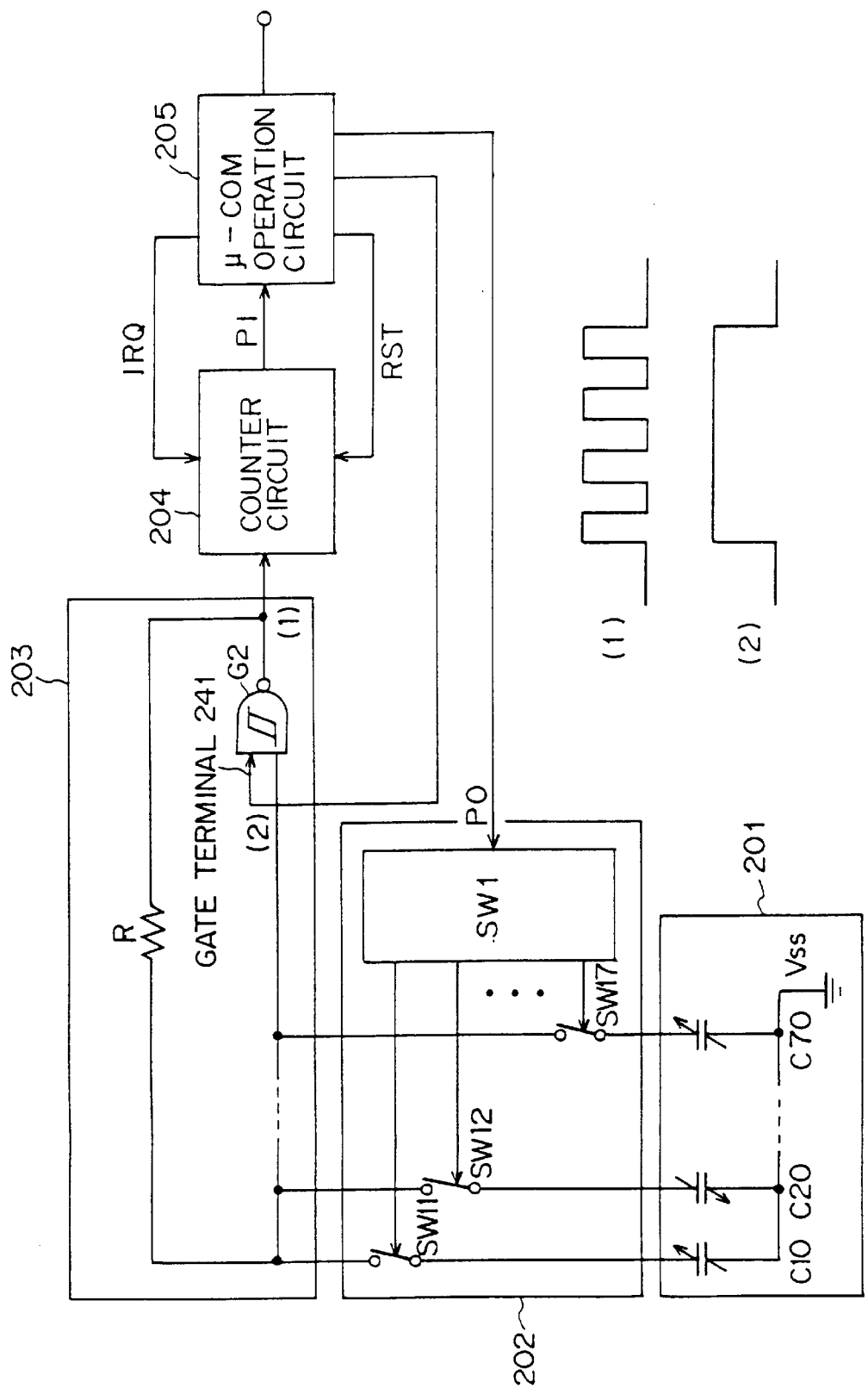
FIG. 29 is a block diagram showing the second example of the configuration of the pressure detecting apparatus corresponding to the sixth embodiment of the present invention.

FIG. 29 is a block diagram showing the second configuration of the pressure detecting apparatus corresponding to the sixth embodiment.

The capacitance-frequency converting circuit 203 converts the Schmidt trigger gate G1 shown in FIG. 27 from an inverter gate to a NAND gate G2. One input terminal of the NAND gate G2 is a control gate terminal 241. When an input from the μ-COM operation circuit 205 to the gate terminal 241 indicates a low level, the NAND gate G2 does not perform any charging or discharging operations. The charging or discharging operations are performed only when it indicates a high level. In this example, a predetermined non-operation time can be set for the NAND gate G2 by controlling an input signal to the gate terminal 241 through the μ-COM operation circuit 205, thereby reducing the power consumption of the apparatus. 1 and 2 shown in FIG. 29 show an example of an output waveform from the NAND gate G2 and an example of an input waveform to the gate terminal 241 respectively.

Figure 30:
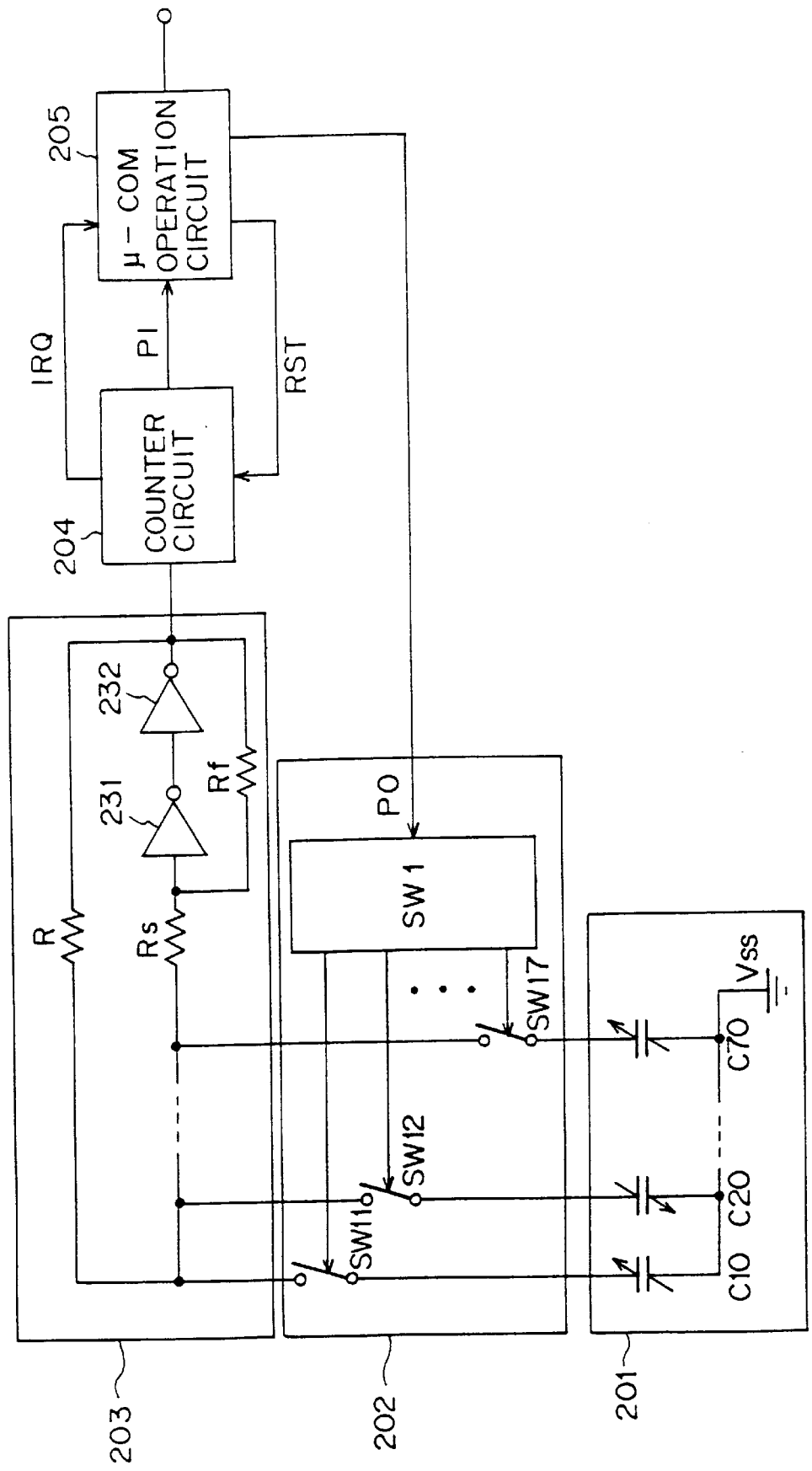
FIG. 30 is a block diagram showing the third example of the configuration of the pressure detecting apparatus corresponding to the sixth embodiment of the present invention.

FIG. 30 is a block diagram showing the third example of the configuration of the pressure detecting apparatus according to the sixth embodiment.

In this example, the Schmidt trigger gate G1 shown in FIG. 27 is replaced with two inverters 231 and 232 and two resistors Rs and Rf. Assume that the threshold of the voltage of the inverter is $V_{TH}$, the voltage (power source voltage) applied to the circuit is $V_{DD}$, the higher of the two voltage thresholds is $V_{TU}$, and the lower of the two voltage thresholds is $V_{TL}$. These values appear in the following equations (21) through (23).

$$V_{TL}=(Rs+Rf)/Rf \cdot \{V_{TH}-Rs \cdot V_{DD}/(Rs-Rf)\} \quad (21)$$

$$V_{TU}=(Rs+Rf) \cdot V_{TH}/Rf \quad (22)$$

$$V_{TU}-V_{TL}=Rs \cdot V_{DD}/Rf \quad (23)$$

As a result, the difference between the two thresholds of the voltages can be arbitrary set by selecting the resistance values of the resistors Rs and Rf based on the above described equation (23).

The pressure detecting apparatus according to the present invention detects a pressure as a change in capacitance, converts a detection signal into an electric signal or optical signal, and then transmits the result to a distant receiving unit, etc., thereby reducing the electric power consumption of the apparatus. In this case, a high current flows in a switching process if the gate, etc. comprises a CMOS device. To obtain a smaller effective value of electric power consumption, an oscillation frequency in the charging or discharging operation should be made smaller. Therefore, when the width of the voltage threshold is set to a large value with the configuration shown in FIG. 30, the oscillation frequency can be smaller, thereby reducing the power consumption of the apparatus.

Figure 31:
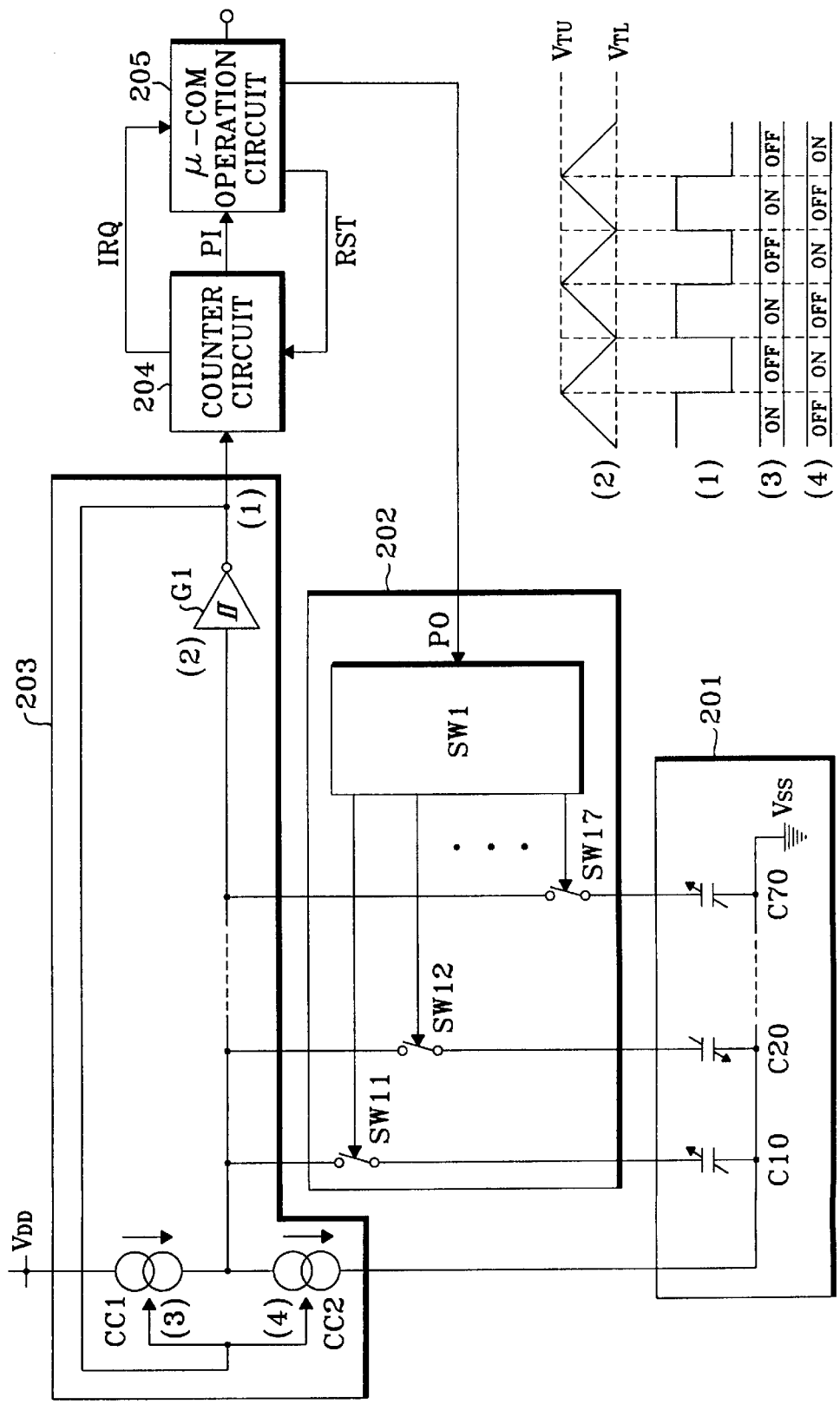
FIG. 31 is a block diagram showing the fourth example of the configuration of the pressure detecting apparatus corresponding to the sixth embodiment of the present invention.

FIG. 31 is a block diagram showing the fourth example of the configuration of the pressure detecting apparatus according to the sixth embodiment.

In this example, two switches CC1 and CC2 each comprising CMOS transistors, etc. are used as shown in FIG. 31. These switches are switched according to the output from the gate G1 so as to control the voltage supply from the constant current source $V_{DD}$ to perform the charge or discharge of capacitor. Waveforms (1) and (2) shown in FIG. 31 respectively show an output waveform and an input waveform of the gate G1, and waveforms (3) and (4) respectively show gate signals for transistors CC1 and CC2. With this configuration, the slope of the voltage around the voltage threshold becomes large as compared with the case where the charging and discharging voltage is changed through a resistor and a capacitance, which indicates an exponential form. Therefore, the apparatus is little affected by noise, etc. With a CMOS transistor, there is another merit that the temperature drift can be set to zero because the source voltage is used.

Figure 32:
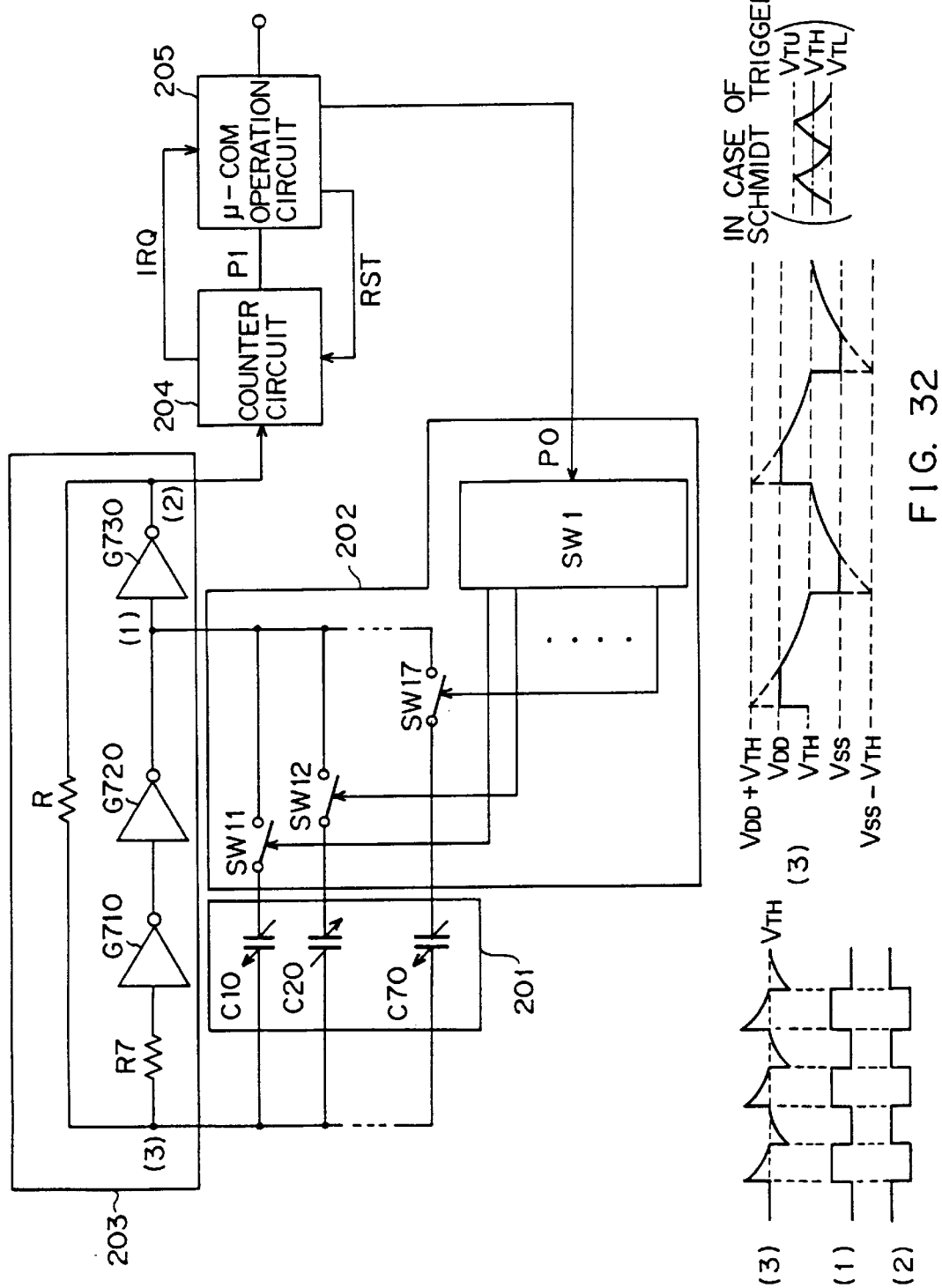
FIG. 32 is a block diagram showing the fifth example of the configuration of the pressure detecting apparatus corresponding to the sixth embodiment of the present invention.

FIG. 32 is a block diagram showing the fifth example of the configuration according to the sixth embodiment. Waveforms (1), (2), and (3) shown in FIG. 32 respectively show an output waveform and an input waveform of the gate G1 and the charging and discharging voltage waveform of the capacitors.

In this example, an oscillation circuit comprises three inverters G710, G720, and G730, a charging and discharging resistor R, and capacitors C10 through C70 to perform a charging or discharging process using one voltage threshold. A protective resistor R7 maintains the charging and discharging voltage shown in (3) in FIG. 32 not to exceed the source voltage range $V_{SS}$ through $V_{DD}$. That is, since the gate G730 indicates a high (H) level when its input indicates a low (L) level, the capacitor is charged through the resistor R. When the charging voltage exceeds the threshold $V_{TH}$, the output from the gate G730 is inverted to the L level and the electric charge of the capacitor is discharged through the resistor R. When the discharging voltage to the gate G730 becomes lower than the threshold $V_{TH}$, the output from the gate G730 indicates the H level, thereby charging the capacitor again through the resistor R. As shown by the charging and discharging voltage waveform indicated by (3) in FIG. 32, the change in charging and discharging voltage can be larger than in the Schmidt trigger method (refer to the figure enclosed by parentheses in (3) of FIG. 32. As a result, the oscillation frequency can be made smaller as described above and the power consumption can be successfully reduced.

Figure 33:
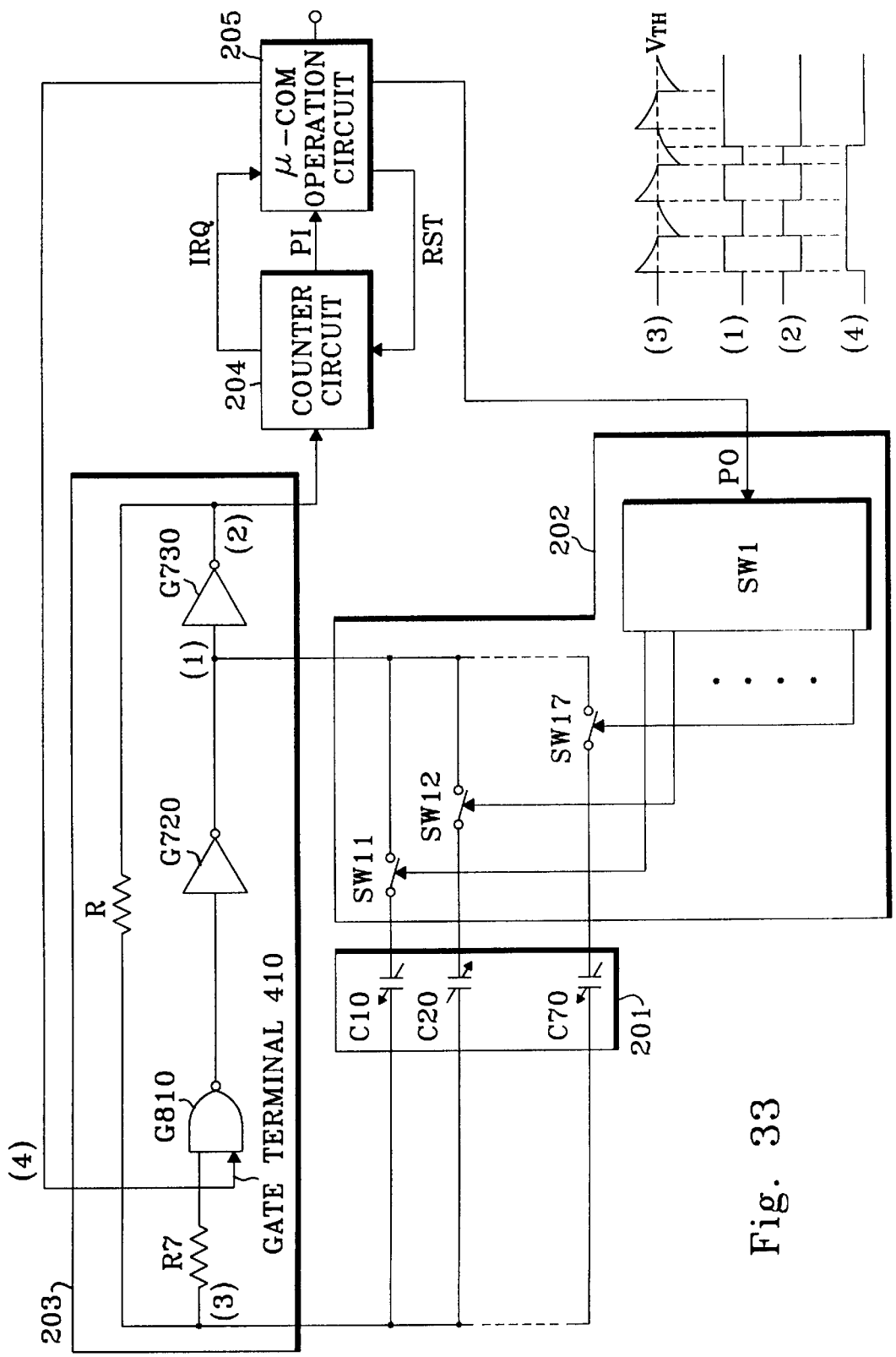
FIG. 33 is a block diagram showing the sixth example of the configuration of the pressure detecting apparatus corresponding to the sixth embodiment of the present invention.

FIG. 33 is a block diagram showing the sixth example of the configuration of the pressure detecting apparatus according to the sixth embodiment. This example is a variation of the apparatus shown in FIG. 32. The inverter gate G710 is converted into a NAND gate G810, and a gate input terminal 410 is provided as shown in FIG. 33. Waveforms (1), (2), (3) and (4) shown in FIG. 33 respectively show an input waveform and an output waveform of the gate G730, the charging and discharging voltage waveform of the capacitors, and one of the two input signal of the NAND gate G810.

Figure 34:
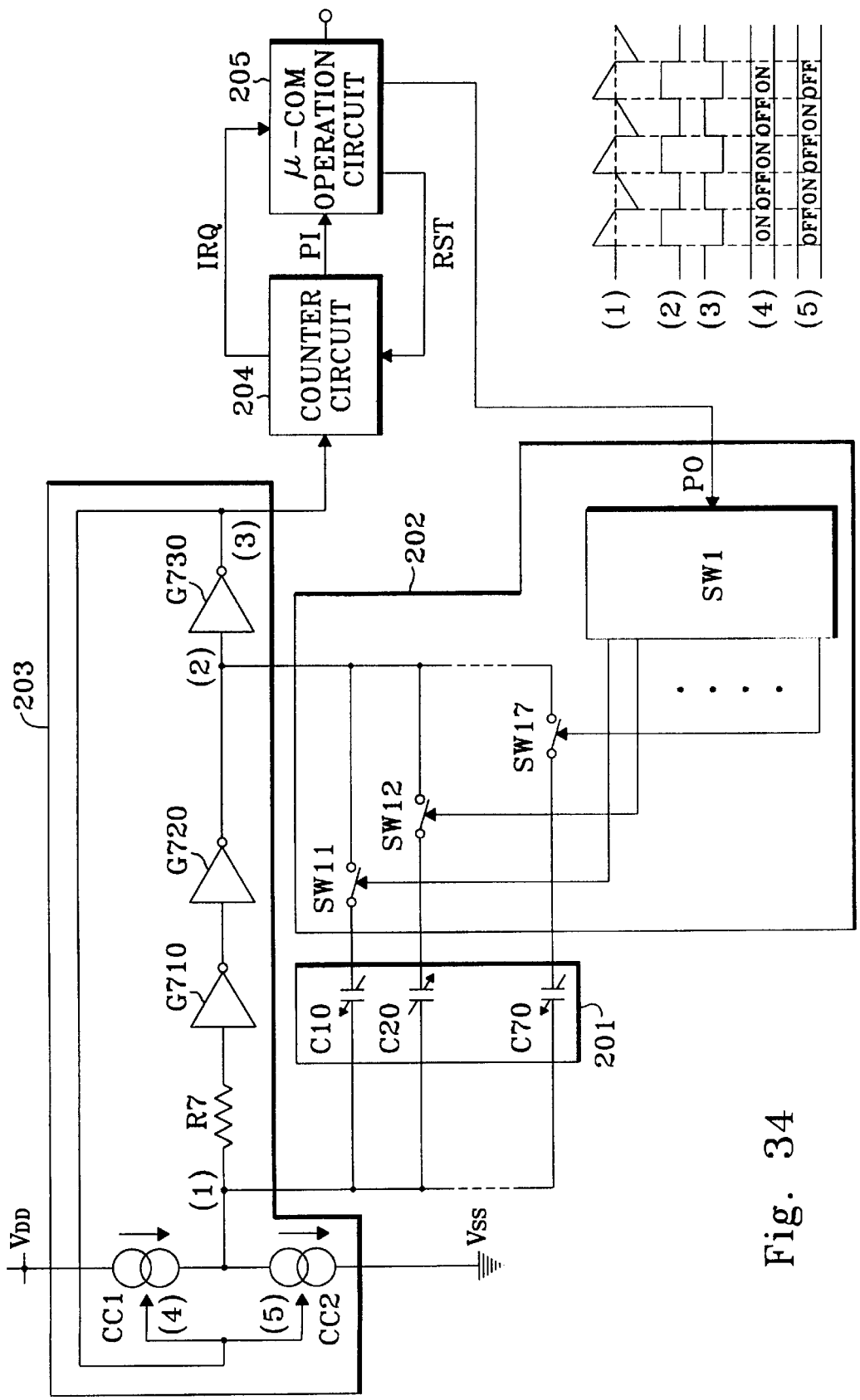
FIG. 34 is a block diagram showing the seventh example of the configuration of the pressure detecting apparatus corresponding to the sixth embodiment of the present invention.

FIG. 34 is a block diagram showing the seventh example of the configuration of the pressure detecting apparatus according to the sixth embodiment. This example is also a variation of the apparatus shown in FIG. 32, and replaces the charging and discharging resistor R7 with the two switches CC1 and CC2. The switches CC1 and CC2 are switched depending on the output from the gate 730, and the voltage supply from the constant current source $V_{DD}$ is controlled, thereby charging and discharging the capacitor. Waveforms (1), (2), (3), (4) and 5 shown in FIG. 33 respectively show the charging and discharging voltage waveform of the capacitors, an input waveform and an output waveform of the gate G730, and the gate signals of the transistors CC1 and CC2.

The pressure detecting apparatus comprising two pressor sensors is described in the sixth embodiment. However, only one pressure sensor can be used or three or more sensors can be provided. In this embodiment, a reference capacitor having an invariable capacitance is incorporated into the two pressure sensors. The reference capacitor can also be applicable to an apparatus provided with one pressure sensor and with three or more pressure sensors.

What is claimed is:

1. A capacitance-based pressure detecting apparatus for detecting pressure applied to a diaphragm based on a capacitance which varies with a change in portion of the diaphragm, comprising:

a diaphragm changing position depending on a differential pressure between a first pressure and a second pressure;

a first electrode provided opposite a first plane of said diaphragm, forming together with said diaphragm, a first capacitor;

a second electrode provided opposite a second plane of said diaphragm, forming, together with said diaphragm, a second capacitor;

a third capacitor altering a capacitance according to the first pressure;

detecting means for detecting the capacitance of said first through third capacitors; and operating means for obtaining pressure applied to said diaphragm based on the capacitance of said first and second capacitors, and amending the obtained pressure based on the capacitance of said third capacitor.

2. The pressure detecting apparatus according to claim 1, further comprising:

switching means for switching connections between said first through third capacitors and said detecting means, and selectively transmitting one of outputs from said first through third capacitors to said detecting means.

3. The pressure detecting apparatus according to claim 1, wherein said third capacitor comprises a third electrode formed on an insulation substrate and a conductive substrate; and a vacuum is substantially maintained between said third electrode and a conductive substrate.

4. The pressure detecting apparatus according to claim 1, further comprising:

a fourth capacitor altering a capacitance according to ambient temperature of said diaphragm, wherein said operating means performs a temperature amendment for the obtained pressure based on the capacitance of said fourth capacitor.

5. The pressure detecting apparatus according to claim 4, further comprising:

switching means for switching connections between said first through fourth capacitors and said detecting means, and selectively transmitting one of outputs from said first through fourth capacitors to said detecting means.

6. The pressure detecting apparatus according to claim 4, wherein said fourth capacitor comprises a conductive substrate and said third electrode having an insulation substrate therebetween.

7. The pressure detecting apparatus according to claim 4, wherein said fourth capacitor comprises a pair of electrodes having a dielectric substrate therebetween.

8. The pressure detecting apparatus according to claim 4, wherein said fourth capacitor comprises a pair of comb-shaped electrodes incorporated into each other on a plane of a substrate.

9. The pressure detecting apparatus according to claim 1, further comprising:

a fourth capacitor sandwiching a pressure conducting medium for transmitting said first pressure to said diaphragm, wherein said operating means performs an amendment depending on a change in a dielectric constant of the pressure conducting medium for the obtained pressure, based on the capacitance of said fourth capacitor.

10. The pressure detecting apparatus according to claim 9, further comprising:

switching means for switching connections between said first through fourth capacitors and said detecting means, and selectively transmitting one of outputs from said first through fourth capacitors to said detecting means.

11. The pressure detecting apparatus according to claim 9, wherein said fourth capacitor comprises a third electrode formed on an insulation substrate and a conductive substrate, wherein the pressure conducting medium is filled between said third electrode and said conductive substrate.

12. The pressure detecting apparatus according to claim 9, wherein said fourth capacitor comprises a pair of comb-shaped electrodes incorporated into each other on a plane of an insulation substrate, and the pressure conducting medium is filled therebetween.

13. The pressure detecting apparatus according to claim 1, wherein said third capacitor comprises a third electrode formed on an insulation substrate and a conductive substrate, wherein a vacuum is substantially maintained between said third electrode and a conductive substrate; and a portion of said conductive substrate corresponding to said third capacitor is formed as having a predetermined thickness by performing a plasma-etching process on both sides of said conductive substrate.

14. The pressure detecting apparatus according to claim 1, further comprising:

a second diaphragm changing position depending on a differential pressure between the first pressure and the second pressure;

a third electrode provided opposite a first plane of said second diaphragm, forming, together with said second diaphragm, a fourth capacitor; and a fourth electrode provided opposite a second plane of said second diaphragm, forming, together with said second diaphragm, a fifth capacitor.

15. The pressure detecting apparatus according to claim 14, further comprising:

switching means for switching connections between said first through fifth capacitors and said detecting means, and selectively transmitting one of outputs from said first through fifth capacitors to said detecting means.

16. The pressure detecting apparatus according to claim 15, further comprising:

a sixth capacitor altering a capacitance according to ambient temperature of said diaphragm, wherein said operating means performs temperature amendment for the obtained pressure based on the capacitance of said sixth capacitor.

17. The pressure detecting apparatus according to claim 16, wherein said switching means switches connections between said first through sixth capacitors and said detecting means, and selectively transmits one of outputs from said first through sixth capacitors to said detecting means.

18. The pressure detecting apparatus according to claim 16, wherein said sixth capacitor comprises a conductive substrate and said fifth electrode having an insulation substrate therebetween.

19. The pressure detecting apparatus according to claim 14, wherein said diaphragm is made thinner than said second diaphragm.

20. The pressure detecting apparatus according to claim 14, wherein said operating means comprises averaging means for averaging a pressure value computed based on the capacitances of said first and second capacitors and a pressure value computed based on the capacitances of said third and fourth capacitors, and then outputting a averaging result.

21. The pressure detecting apparatus according to claim 14, wherein said operating means comprises sensor selecting means for selecting one of a pressure value computed based on the capacitances of said first and second capacitances and a pressure value computed based on the capacitances of said third and fourth capacitances, and then outputting a selected value.

22. The pressure detecting apparatus according to claim 14, wherein said operating means comprises composite signal generating means for combining in a predetermined method a pressure value computed based on the capacitances of said first and second capacitors with a pressure value computed based on the capacitances of said third and fourth capacitors, and then outputting a combination result.

23. The pressure detecting apparatus according to claim 14, wherein said operating means comprises:

averaging means for averaging a pressure value computed based on the capacitances of said first and second capacitors and a pressure value computed based on the capacitances of said third and fourth capacitors, and then outputting a averaging result;

sensor selecting means for selecting one of a pressure value computed based on the capacitances of said first and second capacitors and a pressure value computed based on the capacitances of said third and fourth capacitors, and then outputting a selected value;

composite signal generating means for combining in a predetermined method a pressure value computed based on the capacitances of said first and second capacitors with a pressure value computed based on the capacitances of said third and fourth capacitors, and then outputting a combination result; and an output operation amending unit for obtaining an output signal by selectively operating one of said averaging means, composite signal generating unit, and sensor selecting means.

24. The pressure detecting apparatus according to claim 16, further comprising:

a seventh capacitor sandwiching a pressure conducting medium for transmitting said first pressure to said diaphragm and said second diaphragm, wherein said operating means performs an amendment depending on a change in dielectric constant of the pressure conducting medium for the pressure obtained based on the capacitance of said seventh capacitor.

25. The pressure detecting apparatus according to claim 24, wherein said switching means switches connections between said first through seventh capacitors and said detecting means, and selectively transmits one of the outputs from said first through seventh capacitors and said detecting means.

26. The pressure detecting apparatus according to claim 24, wherein said detecting means comprises:

capacitance converting means for converting the capacitance of said first through seventh capacitors into a pulse signal;

a counter circuit for detecting a number of pulses of the pulse signal and a generation time of the pulse signal; and an operating circuit for determining the capacitance of said first through seventh capacitors.

27. The pressure detecting apparatus according to claim 26, wherein said capacitance converting means comprises a Schmidt trigger gate for generating one pulse before a discharging voltage of said first through seventh capacitors reaches a second threshold after exceeding a first threshold.

28. The pressure detecting apparatus according to claim 26, wherein said capacitance converting means comprises a NAND gate for generating one pulse before a discharging voltage of said first through seventh capacitors reaches a second threshold after reaching a first threshold when a gate voltage indicates a high level.

29. The pressure detecting apparatus according to claim 26, wherein said capacitance converting means comprises a circuit, comprising two resistors and two inverters, for generating one pulse before a discharging voltage of said first through seventh capacitors reaches a second threshold after exceeding a first threshold.

30. The pressure detecting apparatus according to claim 26, wherein said capacitance converting means comprises a circuit, comprising two switches connected to a constant current source and a gate, for generating one pulse before a discharging voltage of said first through seventh capacitors reaches a second threshold after exceeding a first threshold.

31. The pressure detecting apparatus according to claim 26, wherein said capacitance converting means comprises a circuit comprising a first resistor, and a second resistor, and three inverters connected in parallel to said first resistor.

32. The pressure detecting apparatus according to claim 26, wherein said capacitance converting means comprises a circuit comprising a first resistor, and a second resistor, a NAND gate, and two inverters connected in parallel to said first resistance.

33. The pressure detecting apparatus according to claim 26, wherein said capacitance converting means comprises a serial circuit comprising two switches connected to a constant current source, a resistor, and three inverters.

* * * * *

UNITED STATES PATENT AND TRADEMARK OFFICE
CERTIFICATE OF CORRECTION

PATENT NO. : 5,992,240
DATED : November 30, 1999
INVENTOR(S) : Tsuroka et al.

Page 1 of 1

It is certified that error appears in the above-identified patent and that said Letters Patent is hereby corrected as shown below:

<u>Title Page</u>:
Under "[56] References Cited U.S. Patent Documents" please insert:

-- 5,623,102 4/1997 Arndt et al. -- therefor

Under "[56] References Cited, Foreign Patent Documents" please insert

-- 40421411C2 10/1990 Germany -- therefor

Under "[56] References Cited, Other Publications" please insert

-- Beck, Ch., Kampfrath, G. Modulares Kapazitives Sensorsystem für prozeBnahe Messungen. In: msr, Berlin, 33, 1990,9, S. 406-409; w/translation of Einleitung.

Werthschutzky, R. Einsatz Von Siliziumsensoren in ProzeBmebgeräten zur Druckmessung - Stand and Tendenzen. In: tm Technisches Messen, 59, 1992, 9, S. 342-344.

Schröder, D.: Kompensation systematischer MeBabweichungen Kapazitiver Druck - und Differenzdrucksensoren. In: tm Technisches Messen 60, 1993, 4, S. 141-151. --

Signed and Sealed this

Twenty-fifth Day of September, 2001

*Attest:*

Nicholas P. Godici

*Attesting Officer*

NICHOLAS P. GODICI
*Acting Director of the United States Patent and Trademark Office*